US012618792B2

(12) United States Patent
Shibata et al.

(10) Patent No.: US 12,618,792 B2
(45) Date of Patent: May 5, 2026

(54) GAS SENSOR

(71) Applicant: TDK CORPORATION, Tokyo (JP)

(72) Inventors: Makoto Shibata, Tokyo (JP); Shizuko Ono, Tokyo (JP); Takumi Matsuo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 366 days.

(21) Appl. No.: 18/533,621

(22) Filed: Dec. 8, 2023

(65) Prior Publication Data

US 2024/0201117 A1     Jun. 20, 2024

(30) Foreign Application Priority Data

Dec. 15, 2022     (JP) ................................. 2022-200511
Sep. 15, 2023     (JP) ................................. 2023-150361

(51) Int. Cl.
*G01N 27/12* (2006.01)

(52) U.S. Cl.
CPC .................................. *G01N 27/123* (2013.01)

(58) Field of Classification Search
CPC ............................. G01N 27/123; G01N 27/16
See application file for complete search history.

(56) References Cited

U.S. PATENT DOCUMENTS

| | | | | |
|---|---|---|---|---|
| 6,906,392 B2 * | 6/2005 | Benzel | .................. | B81B 3/0081 |
| | | | | 257/532 |
| 7,157,054 B2 * | 1/2007 | Toyoda | ................ | G01N 27/128 |
| | | | | 376/256 |
| 7,963,147 B2 * | 6/2011 | Jun | ...................... | G01N 27/128 |
| | | | | 73/25.05 |
| 8,101,448 B2 * | 1/2012 | Renna | ................. | B81C 1/00158 |
| | | | | 257/E21.573 |
| 10,241,094 B2 * | 3/2019 | Ahn | ...................... | G01N 27/123 |
| 10,697,920 B2 * | 6/2020 | Shibasaki | .......... | G01N 33/0027 |
| 12,031,930 B2 * | 7/2024 | Nakamura | ........... | G01N 27/128 |
| 12,055,507 B2 * | 8/2024 | Kimura | ................ | G01N 27/123 |
| 12,461,056 B2 * | 11/2025 | Akasaka | ............ | G01N 27/4077 |
| 2003/0039586 A1 * | 2/2003 | Toyoda | ................ | G01N 27/128 |
| | | | | 216/2 |
| 2018/0106745 A1 * | 4/2018 | Shibasaki | .............. | G01N 27/16 |

(Continued)

FOREIGN PATENT DOCUMENTS

| | | |
|---|---|---|
| JP | 6877397 B2 | 5/2021 |
| JP | 6960645 B2 | 11/2021 |

*Primary Examiner* — Freddie Kirkland, III
(74) *Attorney, Agent, or Firm* — OLIFF PLC

(57) ABSTRACT

A gas sensor includes a base member, a first insulating film, a second insulating film, a heater section, a flat section, and a gas detection section. The base member is provided with a cavity. The first insulating film includes beam portions connected to a peripheral portion of the cavity of the base member and a first-insulating-film membrane portion held over the cavity by the beam portions. The second insulating film is laminated on an upper side of the first insulating film. The heater section is provided on an upper side of the first-insulating-film membrane portion. The flat section is provided between the first-insulating-film membrane portion and the second insulating film and disposed closer to a center of the first-insulating-film membrane portion than the heater section and forms a flat surface. The gas detection section is disposed on at least the second insulating film over the flat section.

12 Claims, 24 Drawing Sheets

(56) References Cited

U.S. PATENT DOCUMENTS

| 2019/0064094 | A1* | 2/2019 | Ahn | G01N 27/30 |
| 2021/0270760 | A1 | 9/2021 | Sai et al. | |
| 2022/0221416 | A1 | 7/2022 | Kimura et al. | |
| 2024/0328979 | A1* | 10/2024 | Matsuo | G01N 27/12 |
| 2024/0328981 | A1* | 10/2024 | Shibata | G01N 27/16 |

* cited by examiner

GAS SENSOR

CROSS-REFERENCE TO RELATED APPLICATIONS

The present application claims priority from Japanese Patent Application No. 2022-200511 filed on Dec. 15, 2022, and Japanese Patent Application No. 2023-150361 filed on Sep. 15, 2023, the entire contents of which are hereby incorporated by reference.

BACKGROUND

The present disclosure relates to a gas sensor.

A gas sensor is a device that detects gases existing in an atmosphere and converts information on their type, concentration, etc., into electrical signals for output. Such a gas sensor is installed in home appliances, industrial equipment, environmental monitoring equipment, etc. and is used to detect the concentration of specific gases that affect humans, the environment, etc.

Various detection methods are known for gas sensors, depending on the type of gas to be detected, concentration range, accuracy, operating principle, constituent material, etc. Among them, a gas sensor combining a detection section and a heater for controlling the temperature around the detection section is being developed as a sensor capable of reducing errors caused by temperature effects.

For example, as one of the gas sensors according to the prior art, there is a gas sensor with a heater wire disposed on the outer periphery of a membrane and a detection electrode disposed on the inner part of the membrane (see, for example, Patent Document 1). In such a gas sensor, it is difficult to transmit heat from the heater wire to the central part of the membrane, which may increase the non-uniformity of temperature distribution around the detection electrode and adversely affect detection stability. Meanwhile, a technique is also proposed in which a heater wire and a detection electrode are stacked in layers in a membrane (see, for example, Patent Document 2). In such a technique, it is difficult to form the detection electrode as an upper layer on a flat surface due to the unevenness of the pattern shape of the heater wire as a lower layer, so there are problems that local distortions tend to occur in the shape of the detection electrode, which destabilizes the detection signal and reduces detection responsiveness. Moreover, in the technique of stacking the heater wire and the detection electrode in layers, it is conceivable to planarize an intermediate layer by CMP, etc., but if such a measure is taken, there are problems that lead to an increase in process lead time and cost.

Patent Document 1: JP6960645 (B2)
Patent Document 2: JP6877397 (B2)

SUMMARY

It is desirable to provide a gas sensor capable of being manufactured in a simple process and demonstrating good detection stability and detection responsiveness.

A gas sensor according to the present disclosure comprises:
  a base member provided with a cavity;
  a first insulating film including:
    a plurality of beam portions connected to a cavity peripheral portion as a peripheral portion of the cavity of the base member; and a first-insulating-film membrane portion held over the cavity by the beam portions;
  a second insulating film laminated on an upper side of the first insulating film;
  a heater section provided on an upper side of the first-insulating-film membrane portion;
  a flat section provided between the first-insulating-film membrane portion and the second insulating film, disposed closer to a center of the first-insulating-film membrane portion than the heater section when viewed from above, and forming a flat surface facing upward; and
  a gas detection section disposed on at least the second insulating film over the flat section and having an area smaller than that of the flat surface.

BRIEF DESCRIPTION OF THE DRAWING(S)

FIG. 3 is a schematic cross-sectional view of the gas sensor shown in FIG. 1 along III-III;

FIG. 14 is a schematic cross-sectional view of the gas sensor shown in FIG. 13 along XIV-XIV;

DETAILED DESCRIPTION

Hereinafter, the present disclosure is described in detail in the following order based on specific embodiments and the like.

1. First Embodiment
1.1. Overall Structure
1.2. Base Member
1.3. First and Second Insulating Films
1.4. Heater Section and Heater Wiring Section
1.5. Flat Section
1.6. Gas Detection Section and Detection Wiring Section
1.7. Semiconductor Material
1.8. Manufacturing Method
1.9. Effects
2. Second Embodiment
3. Third Embodiment
4. Modified Examples
5. Examples and Comparative Examples

1. First Embodiment

Figure 1:
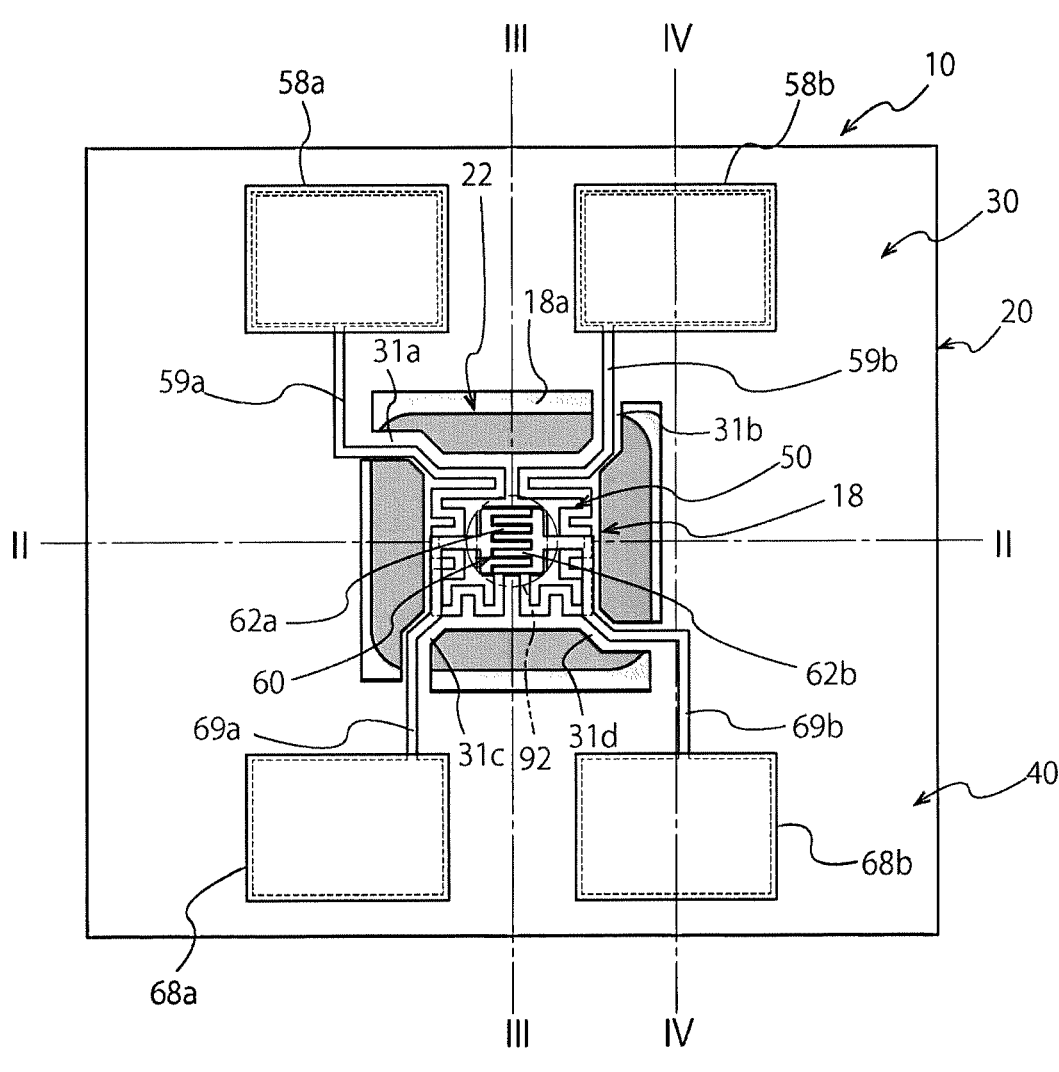
FIG. 1 is a schematic plan view of a gas sensor according to First Embodiment of the present disclosure.
Figure 1:
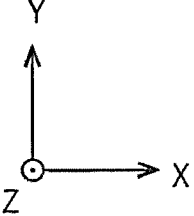

FIG. 1 is a schematic plan view illustrating a gas sensor 10 according to First Embodiment and is a view of the gas sensor 10 viewed from above. Note that, in FIG. 1, a second insulating film 40 is seen through, and a semiconductor material 92 is shown only for its arrangement by an imaginary line. The gas sensor 10 includes a heater section 50 and a gas detection section 60 supported by a membrane 18 having a thin film shape, and the like. Gases to be detected are a flammable gas and a reducing gas, such as carbon monoxide (CO), methane ($CH_4$), propane ($C_3H_8$), and ethanol ($C_2H_5OH$).

The gas sensor 10 includes the semiconductor material 92 whose resistance value changes upon contact with a reducing gas. The gas detection section 60 of the gas sensor 10 includes at least one pair of electrodes 62a and 62b in contact with the semiconductor material 92. The gas sensor 10 detects a gas concentration based on resistance change of the semiconductor material 92 connecting the electrodes 62a and 62b. The gas sensor 10 using the semiconductor material 92 achieves a highly sensitive and reliable gas sensor 10, particularly in a low concentration region.

Note that, the gas sensor according to the present disclosure is not limited to a gas sensor including the semiconductor material 92 and the pair of electrodes 62a and 62b and includes a gas sensor containing a catalyst material, a Pt wire, a thermistor film, and the like (see Second and Third Embodiments, etc.). Moreover, the gas sensor according to the present disclosure includes a gas sensor containing a reference gas sensor that does not directly have a gas detection function, a gas sensor containing a plurality of mutually different gas detection sections, and the like.

(1.1. Overall Structure)

Figure 2:
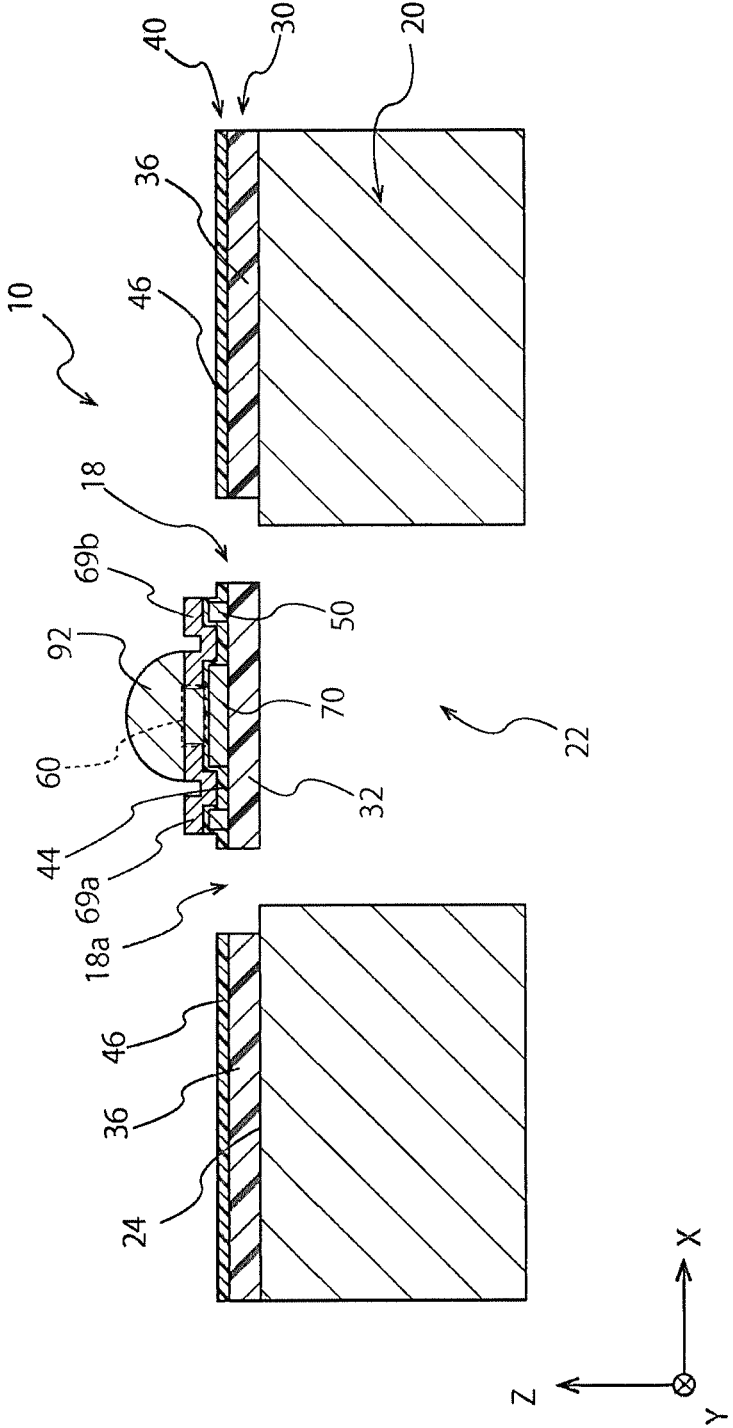
FIG. 2 is a schematic cross-sectional view of the gas sensor shown in FIG. 1 along II-II.

FIG. 2 is a schematic cross-sectional view of the gas sensor 10 taken along a plane along the line II-II in FIG. 1.

Figure 3:
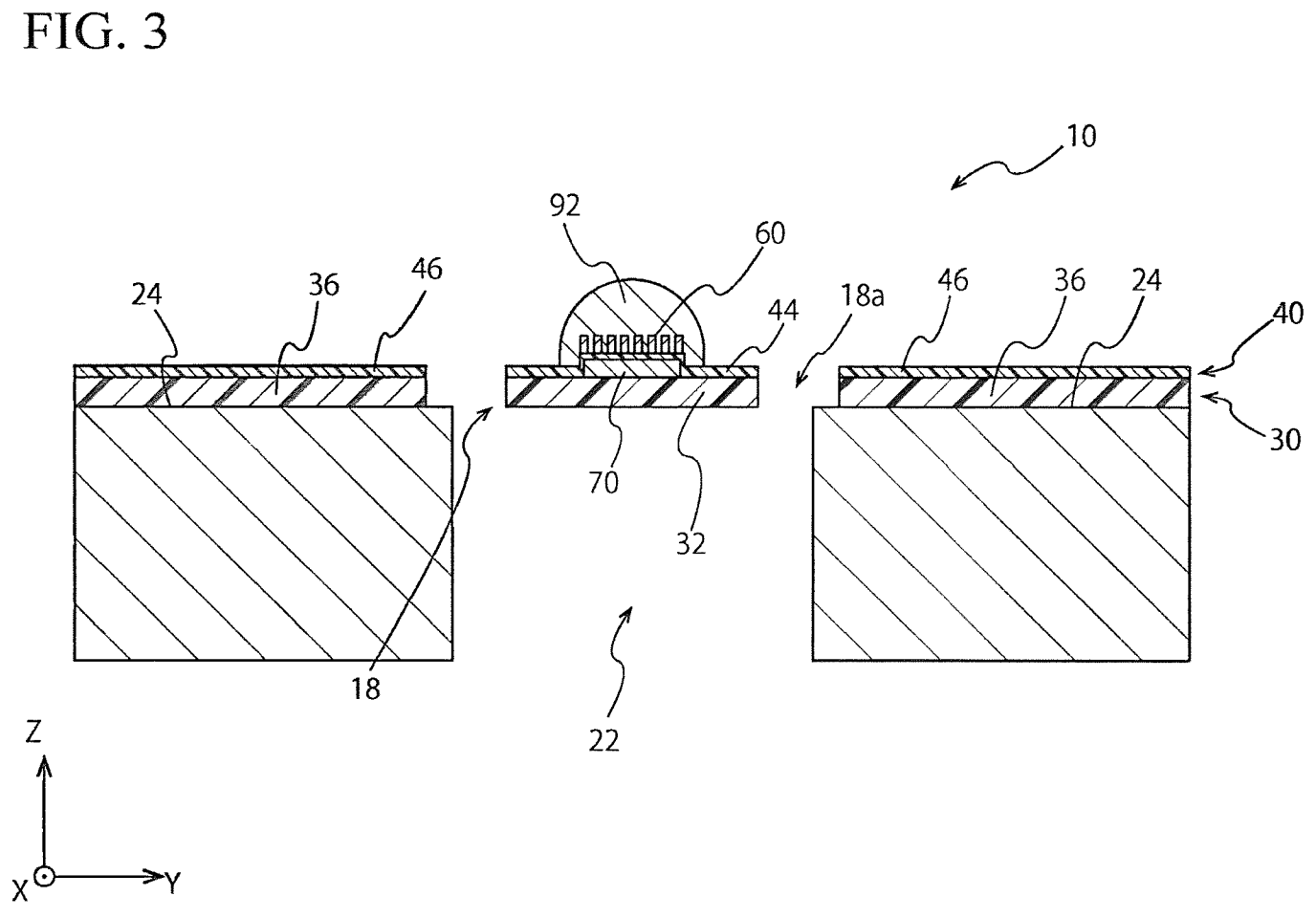
Figure 4:
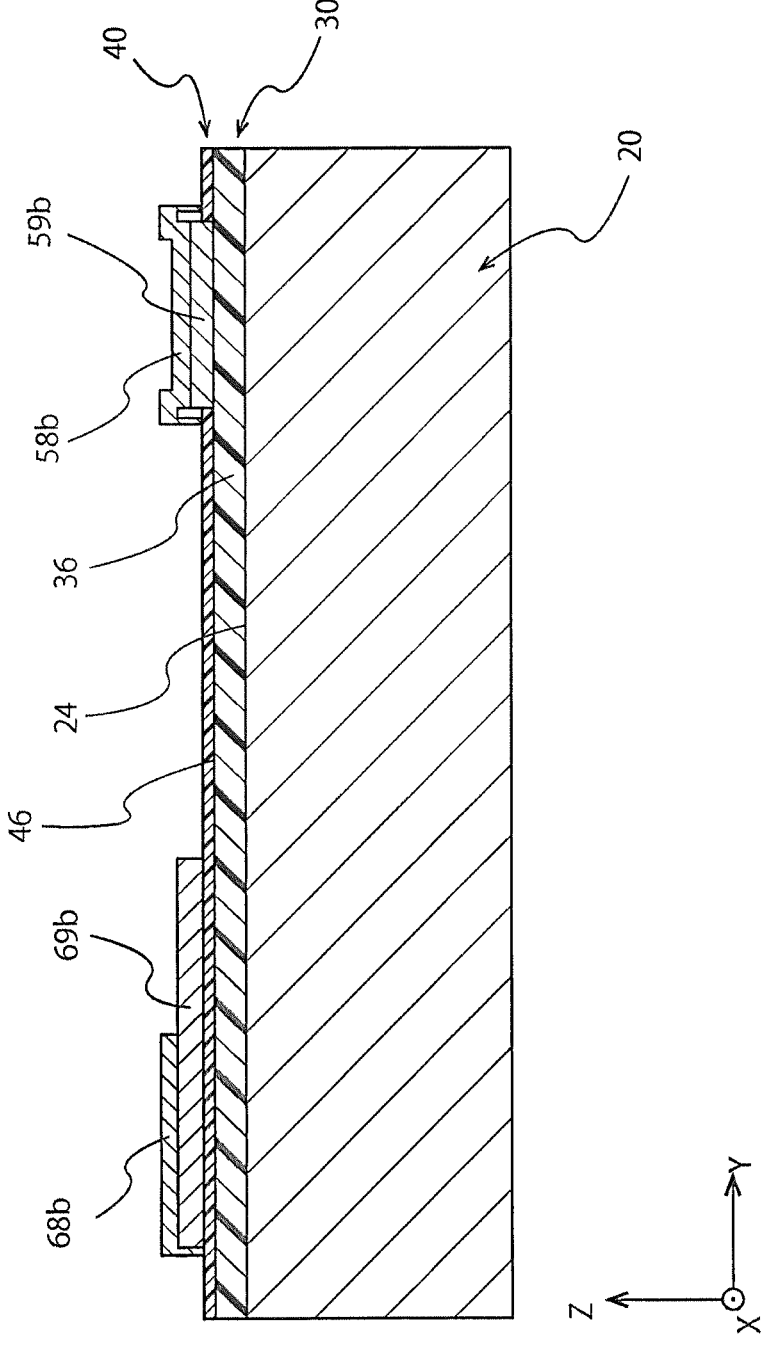
FIG. 4 is a schematic cross-sectional view of the gas sensor shown in FIG. 1 along IV-IV.

FIG. 3 is a schematic cross-sectional view of the gas sensor 10 taken along the line III-III in FIG. 1. FIG. 4 is a schematic cross-sectional view of the gas sensor 10 taken along the line IV-IV in FIG. 1. In the description of the gas sensor 10, the vertical direction of the gas sensor 10 is defined as the Z-axis, the direction perpendicular to the Z-axis and parallel to a reference line A1 (see FIG. 6) as an axis of symmetry of the heater section 50 is defined as the Y-axis, and the direction perpendicular to the Z-axis and the Y-axis is defined as the X-axis. Note that, the Z-axis direction in the gas sensor 10 corresponds with the lamination direction of a first insulating film 30, a second insulating film 40, and the like described below. Moreover, in the description of the gas sensor 10, the side from a base member 20 to the first insulating film 30 and the second insulating film 40 is referred to as the upper side and the positive side in the Z-axis direction, and the opposite side to the upper side and the positive side in the Z-axis direction is referred to as the lower side and the negative side in the Z-axis direction.

As shown in FIG. 1 and FIG. 2, the gas sensor 10 includes the base member 20 provided with a cavity 22. As shown in FIG. 2, other members of the gas sensor 10 are arranged above the cavity 22 of the base member 20 and in a cavity peripheral portion 24 as a peripheral portion of the cavity 22. Other members excluding the base member 20 included in the gas sensor 10 include the first insulating film 30, the second insulating film 40, the heater section 50, a gas detection section 60, heater terminals 58a and 58b, heater wiring sections 59a and 59b, detection terminals 68a and 68b, detection wiring sections 69a and 69b, a flat section 70, a semiconductor material 92, and the like.

(1.2. Base Member)

As shown in FIG. 1, the cavity 22 is formed around the center of the base member 20. A membrane 18 is disposed above the cavity 22. In FIG. 1, the cavity 22 shown below the membrane 18 is illustrated in dark gray.

As shown in FIG. 1 to FIG. 3, the cavity 22 of the base member 20 is constituted by a substantially rectangular through hole in the base member 20, but the shape of the cavity 22 is not limited to only a rectangle. Moreover, the cavity 22 is not limited to only a through hole as shown in FIG. 2 and FIG. 3 and may be constituted by a recessed portion recessed downward from the cavity peripheral portion 24 on the substrate surface side.

The material of the base member 20 is not limited as long as it has a mechanical strength to support the members formed on the cavity 22 and in the cavity peripheral portion 24 and is suitable for microfabrication such as etching. In the present embodiment, examples of the base member 20 include a silicon single crystal substrate, a sapphire single crystal substrate, a ceramic substrate, a quartz substrate, a glass substrate, and a ferrite substrate.

(1.3. First and Second Insulating Films)

As shown in FIG. 1 to FIG. 3, the first insulating film 30 and the second insulating film 40 are formed on the upper side of the cavity 22 formed in a central part of the base member 20 and on the upper side of the cavity peripheral portion 24 constituting the upper surface of the base member 20. As shown in FIG. 1, the first insulating film 30 and the second insulating film 40 are formed on the entire upper side of the base member 20 other than the portion corresponding to a membrane peripheral hole 18a formed around the outer peripheral portion of the cavity 22 with respect to the first insulating film 30 and the portion corresponding to the membrane peripheral hole 18a and the portions where the heater terminals 58a and 58b are formed in the cavity peripheral portion 24 with respect to the second insulating film 40. In the first insulating film 30 and the second insulating film 40, a first-insulating-film membrane portion 32 and a second-insulating-film membrane portion 44 (see FIG. 7) arranged on the cavity 22 constitute the membrane 18 in the gas sensor 10.

As shown in FIG. 1, the first insulating film 30 includes a plurality (four in the embodiment) of beam portions 31a, 31b, 31c, and 31d connected to the cavity peripheral portion 24 as the peripheral portion of the cavity 22 in the base member 20 and the first-insulating-film membrane portion 32 (see FIG. 2 and FIG. 3) held on the cavity 22 via the beam portions 31a to 31d. Moreover, as shown in FIG. 1, the first insulating film 30 includes a first-insulating-film peripheral portion 36 formed on the cavity peripheral portion 24. The beam portions 31a to 31d and the first-insulating-film peripheral portion 36 in the first insulating film 30 are connected on the cavity peripheral portion 24.

As shown in FIG. 2 to FIG. 4, the second insulating film 40 is laminated on the upper side of the first insulating film 30. The planar shape of the second insulating film 40 shown in FIG. 1 is similar to that of the first insulating film 30, except that the second insulating film 40 is not formed in the portions where the heater terminals 58a and 58b are formed. That is, the second insulating film 40 also includes portions laminated on the beam portions 31a to 31d of the first insulating film 30, a second-insulating-film membrane film 44 laminated on the first-insulating-film membrane portion 32 of the first insulating film 30, and a second-insulating-film peripheral portion 46 laminated on the first-insulating-film peripheral portion 36. However, the second insulating film 40 is not limited to only the shape shown in the embodiment, and the planar shape of the second insulating film 40 does not necessarily correspond with the planar shape of the first insulating film 30.

Figure 7:
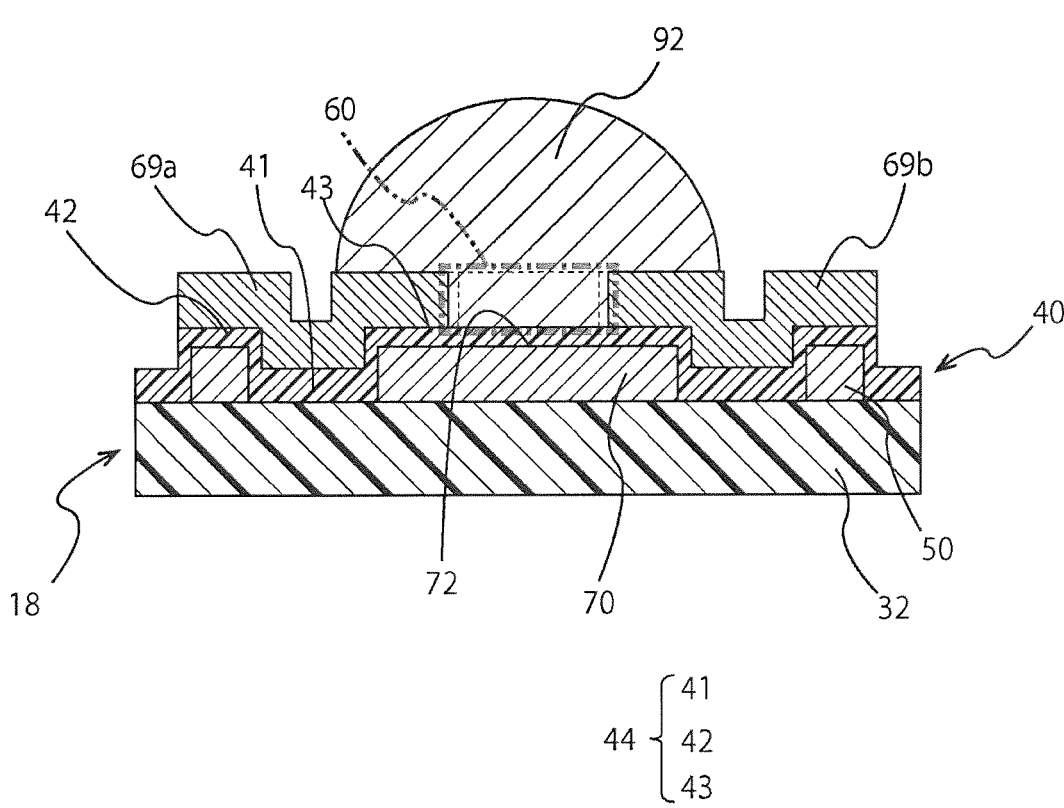
FIG. 7 is an enlarged cross-sectional view of a section of the gas sensor shown in FIG. 2 disposed on the upper side of a cavity.

FIG. 7 is an enlarged cross-sectional view of the section of the gas sensor 10 shown in FIG. 2 disposed on the upper side of the cavity 22. As shown in FIG. 7, the second-insulating-film membrane portion 44 laminated on the first-insulating-film membrane portion 32 of the first insulating film 30 includes a first portion 41, a second portion 42, and a third portion 43. The section of the gas sensor 10 disposed on the upper side of the cavity 22 is described in detail below.

As shown in FIG. 1 to FIG. 3, the membrane peripheral hole 18a is formed around the membrane 18 constituted by the first-insulating-film membrane portion 32 and the second-insulating-film membrane portion 44 so as to surround the membrane 18. As shown in FIG. 2 and FIG. 3, the cavity 22 is formed below the first-insulating-film membrane portion 32, and the first-insulating-film membrane portion 32 is not contact with the base member 20 and is supported against the base member 20 via the beam portions 31a to 31d having small cross-sectional areas.

In such a gas sensor 10, the heat capacity of other substances excluding the gas detection section 60 and the semiconductor material 92 in contact with the gas detection section 60 can be reduced in the vicinity of the gas detection section 60. Due to the structure of the membrane 18 including the beam portions 31a to 31d, the gas sensor 10 has a structure in which the gas detection section 60, etc. disposed in the central part of the membrane 18 is favorably insulated from the base member 20 supporting the membrane 18. Such a gas sensor 10 can greatly reduce the electric power consumption of the heater section 50 required to heat the gas detection section 60 and the semiconductor material 92 to a predetermined temperature.

As shown in FIG. 2 to FIG. 4, the first insulating film 30 is flat as a whole except for the membrane peripheral hole 18a formed thereon, and there are no steps or slopes inside the first insulating film 30. This is because, as described below, the first insulating film 30 is formed on a flat surface such as a flat base member surface. On the other hand, the second insulating film 40 includes a section in direct contact with the top of the first insulating film 30 and a section sandwiching other layers, such as the heater section 50, with the first insulating film 30. Thus, the second insulating film 40 has steps and slopes, particularly inside the second-insulating-film membrane portion 44 shown in FIG. 7 or so.

As described below with reference to FIG. 7, the gas sensor 10 controls the arrangement of steps and slopes formed inside the second-insulating-film membrane portion 44 by providing the flat section 70 and can prevent the problem that the gas detection section 60 formed on the second-insulating-film membrane portion 44 is affected by the unevenness of its underlying layers.

The thicknesses of the first insulating film 30 and the second insulating film 40 are not limited, but the thickness of the first insulating film 30 is preferably larger than the thickness of the second insulating film 40 from the viewpoint of efficiently transmitting the heat of the heater section 50 to the gas detection section 60 and the semiconductor material 92 while maintaining the strength of the membrane 18. The thickness of the first insulating film 30 is preferably, for example, 0.1 to 10 μm and is more preferably, for example, 0.5 to 5 μm. The thickness of the second insulating film 40 is preferably, for example, 0.1 to 5 μm and is more preferably, for example, 0.2 to 2 μm.

The materials of the first insulating film 30 and the second insulating film 40 are selected in consideration of durability against thermal stress, mechanical strength, film stress, adhesion, electrical insulation, etc. and include aluminum oxide, tantalum pentoxide, etc. The materials of the first insulating film 30 and the second insulating film 40 may be the same or different from each other. The first insulating film 30 and the second insulating film 40 may be laminated films having the above-mentioned materials.

(1.4. Heater Section and Heater Wiring Section)

As shown in FIG. 1 and FIG. 2, the heater section 50 is provided on the upper side of the first-insulating-film membrane portion 32 and is provided, in the embodiment, between the first insulating film 30 and the second insulating film 40 in the membrane 18 in the vertical direction. As shown in FIG. 7, which is an enlarged cross-sectional view of a section of the gas sensor 10 shown in FIG. 2 disposed above the cavity 22, the heater section 50 is disposed between the first-insulating-film membrane portion 32 of the first insulating film 30 and the second-insulating-film membrane portion 44 of the second insulating film 40. The heater section 50 produces a Joule heat when energized and adjusts the temperature of the gas detection section 60.

Figure 6:
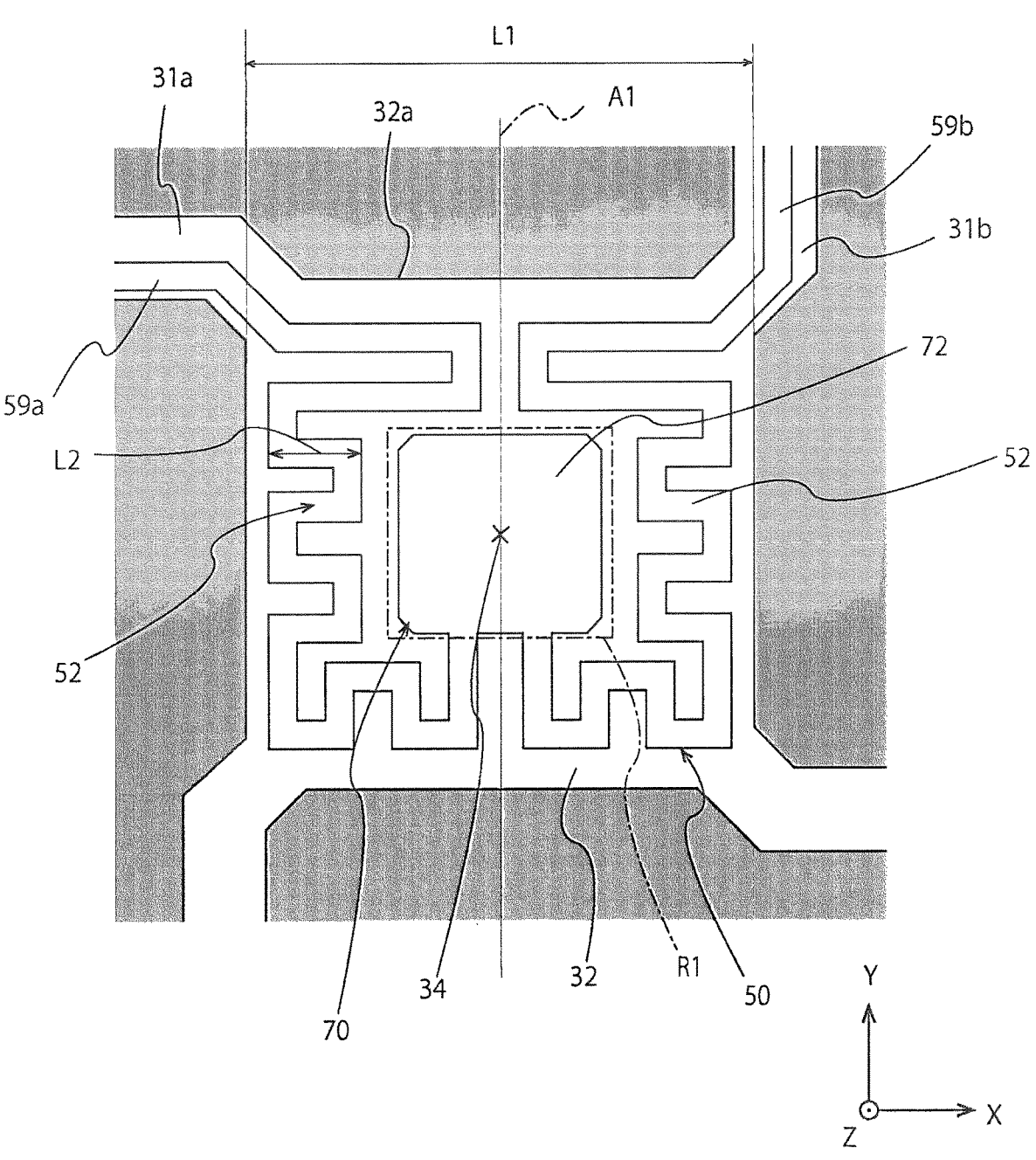
FIG. 6 is a partially enlarged view illustrating the shapes of a heater section, a flat section, and the like in the gas sensor shown in FIG. 1.

FIG. 6 is a partial explanatory diagram illustrating the first insulating film 30, the heater section 50, the heater wiring sections 59a and 59b, and the flat section 70 on the membrane 18 and its peripheral portion in the gas sensor 10. FIG. 6 does not illustrate the second insulating film 40, the gas detection section 60 disposed above the second insulating film 40, and the like in the gas sensor 10.

As shown in FIG. 6, the heater section 50 is formed on the outer side of a central region R1 on the first-insulating-film membrane portion 32 so as to surround the central region R1 in the first-insulating-film membrane portion 32. The heater section 50 includes a bending portion 52 repeatedly bending at an amplitude L2 of ½ or less of a length L1 of a side 32a of the first-insulating-film membrane portion 32 having an approximately rectangular shape. In particular, the bending portion 52 of the heater section 50 is mostly formed of a rectangular wave shape (meander pattern) with a predetermined amplitude L2.

In such a heater section 50, the thermal contraction of the first-insulating-film membrane portion 32 in the first insulating film 30 and the second-insulating-film membrane portion 44 in the second insulating film 40 in contact with the heater section 50 can be prevented from deviating in a predetermined direction. Thus, the gas sensor 10 can effectively reduce detection errors and noises caused by thermal stress in the first insulating film 30 and the second insulating film 40 constituting the membrane 18.

The heater section 50 has a symmetrical shape with respect to a reference line A1 passing through a center 34 of the first-insulating-film membrane portion 32 and extending in the horizontal direction. In such a heater section 50, the temperature distribution of the gas detection section 60 disposed in the central region R1 closer to the center of the membrane 18 than the heater section 50 can be uniform, and the detection stability of the gas sensor 10 can be enhanced.

The heater section 50 is connected to a heater wiring section 59a passing through the beam portion 31a and a heater wiring section 59b passing through the beam portion 31b. As shown in FIG. 1, the heater wiring sections 59a and 59b connect the heater terminals 58a and 58b provided on the cavity peripheral portion 24 and the heater section 50 via the upper side of any (two beam portions 31a and 31b in the embodiment) of the plurality of beam portions 31a to 31b.

As with the heater section 50, the heater wiring sections 59a and 59b are formed between the first insulating film 30 and the second insulating film 40 in the vertical direction. As shown in FIG. 4, however, the portions of the heater wiring sections 59a and 59b formed on the lower side of the heater terminals 58a and 58b are not provided with the second insulating film 40 on the upper side of the heater wiring sections 59a and 59b.

In the heater section 50 of the gas sensor 10, as shown in FIG. 6, the portion connected to the heater wiring sensor 59a and the portion connected to the heater wiring section 59b are approximately symmetrical, and these two portions are electrically connected via the conductive flat section 70. However, the heater section 50 is not limited to one in which two portions are electrically connected via the flat section 70, and the portion connected to the heater wiring section 59a and the portion connected to the heater wiring section 59b may be connected directly.

The materials of the heater section 50 and the heater wiring section 59a are not limited as long as they are conductive. From the viewpoint of enabling a high temperature process in the formation of the gas detection section 60 and the semiconductor material 92, however, the materials of the heater section 50 and the heater wiring section 59a preferably have a comparatively high melting point. Examples of such materials include molybdenum (Mo), platinum (Pt), nickel chromium alloys (NiCr), tungsten (W), tantalum (Ta), palladium (Pd), iridium (Ir), and alloys containing two or more of these. In the present embodiment, platinum is particularly preferable for the reason that it allows for high precision patterning, such as lift-off, and has high durability. Preferably, the heater section 50 and the heater wiring sections 59a and 59b are made of the same material from the viewpoint that they can be formed in the same film formation step, but the heater section 50 and the heater wiring sections 59a and 59b may be made of different materials.

As shown in FIG. 1 and FIG. 2, the heater terminals 58a and 58b are arranged on the heater wiring sections 59a and 59b in the cavity peripheral portion 24 of the base member 20 so as to be in contact with the heater wiring sections 59a and 59b. As shown in FIG. 4, the upper surfaces of the heater terminals 58a and 58b are exposed to the upper side of the gas sensor 10, and an external wiring for supplying electric power to the heater section 50 is connected to the heater terminals 58a and 58b.

The materials of the heater terminals 58a and 58b are not limited as long as they are good conductors and include gold (Au), silver (Ag), platinum (Pt), aluminum (Al), etc. Preferably, from the viewpoint of bondability to the external wiring, etc., the materials of the heater terminals 58a and 58b are gold (Au).

(1.5. Flat Section)

As shown in FIG. 6, similarly to the heater section 50, the flat section 70 is provided between the first insulating film 30 and the second insulating film 40 in the membrane 18 in the vertical direction. That is, as shown in FIG. 7, the flat section 70 is disposed between the first-insulating-film membrane portion 32 of the first insulating film 30 and the second-insulating-film membrane portion 44 of the second insulating film 40.

As shown in FIG. 6, the flat section 70 is disposed in the central region R1 as a region closer to the center of the first-insulating-film membrane portion 32 than the heater section 50 when viewed from above. As shown in FIG. 6 and FIG. 7, the flat section 70 includes a flat surface 72 facing upward and being flat.

The flat section 70 has a substantially rectangular shape when viewed from above, but the planar shape of the flat section 70 is not limited to this and may be a circular shape, an elliptical shape, a polygonal shape other than a rectangular shape, or the like. Preferably, the flat section 70 overlaps with the center 34 of the first-insulating-film membrane portion 32 when viewed from above, from the viewpoint of disposing the gas detection section 60 formed on the flat section 70 in a central part of the membrane 18 and enabling the gas detection section 60 to have a uniform temperature distribution.

The area of the flat section 70 viewed from above is preferably 5 to 25% of the area of the first-insulating-film membrane portion 32 and is more preferably 10 to 20% of the area of the first-insulating-film membrane portion 32. When the area ratio of the flat section 70 to the first-insulating-film membrane portion 32 is larger than a predetermined value, the detection sensitivity of the gas sensor 10 can be obtained favorably with a large formation area of the gas detection section 60. On the other hand, when the area ratio of the flat section 70 to the first-insulating-film membrane portion 32 is smaller than a predetermined value, the temperature responsiveness of the heater section 50 can be obtained favorably with a large formation area of the heater section 50.

Preferably, from the viewpoint of effectively transmitting the heat of the heater section 50 to the gas detection section 60 disposed on the flat section 70 via the second-insulating-film membrane portion 44 of the second insulating film 40 as shown in FIG. 7, the flat section 70 has a thermal conductivity higher than that of the second insulating film 40. Moreover, as shown in FIG. 6, the flat section 70 may be connected to the heater section 50. When the flat section 70 and the heater section 50 are connected, the heat from the heater section 50 is effectively transmitted to the flat section 70 disposed closer to the gas detection section 60, and the thermal responsiveness of the gas sensor 10 can be enhanced. When the flat section 70 has a high thermal conductivity, the temperature uniformity of the gas detection section 60 is improved.

Note that, as shown in FIG. 6, when the two portions of the heater section 50 are connected (connected in series) via the flat section 70, electric current may also flow through the flat section 70 and generate a Joule heat, and the heat generated in the flat section 70 may contribute to temperature adjustment of the gas detection section 60. Since the cross-sectional area of the flat section 70 perpendicular to the electric current direction is larger than that of the heater section 50 perpendicular to the electric current direction, however, if the flat section 70 and the heater section 50 are made of the same material, the amount of heat generated in the flat section 70 is smaller than that in the heater section 50. The Joule heat generated in the flat section 70 can be adjusted not only by the material of the flat section 70, but also by the thickness of the flat section 70, the connection form (series/parallel) between the two portions of the heater section 50 and the flat section 70, or the like. Note that, the thickness of the flat section 70 may be the same as or different from the thickness of the heater section 50.

The material of the flat section 70 is, for example, metal. More specifically, as with the heater section 50, the material of the flat section 70 is, for example, molybdenum (Mo), platinum (Pt), nickel chromium alloy (NiCr), tungsten (W), tantalum (Ta), palladium (Pd), iridium (Ir), or an alloy containing two or more of these. Moreover, the flat section 70 may be made of the same material as the heater section 50. In this case, the flat section 70 can be formed by the same film forming process as the heater section 50, and the manufacturing process can be simplified. However, the flat section 70 may be made of a material different from that of the heater section 50. In addition to the above-mentioned ones, the materials of the flat section 70 different from those of the heater section 50 include silver (Ag), copper (Cu), aluminum (Al), and the like.

(1.6. Gas Detection Section and Detection Wiring Section)

Figure 5:
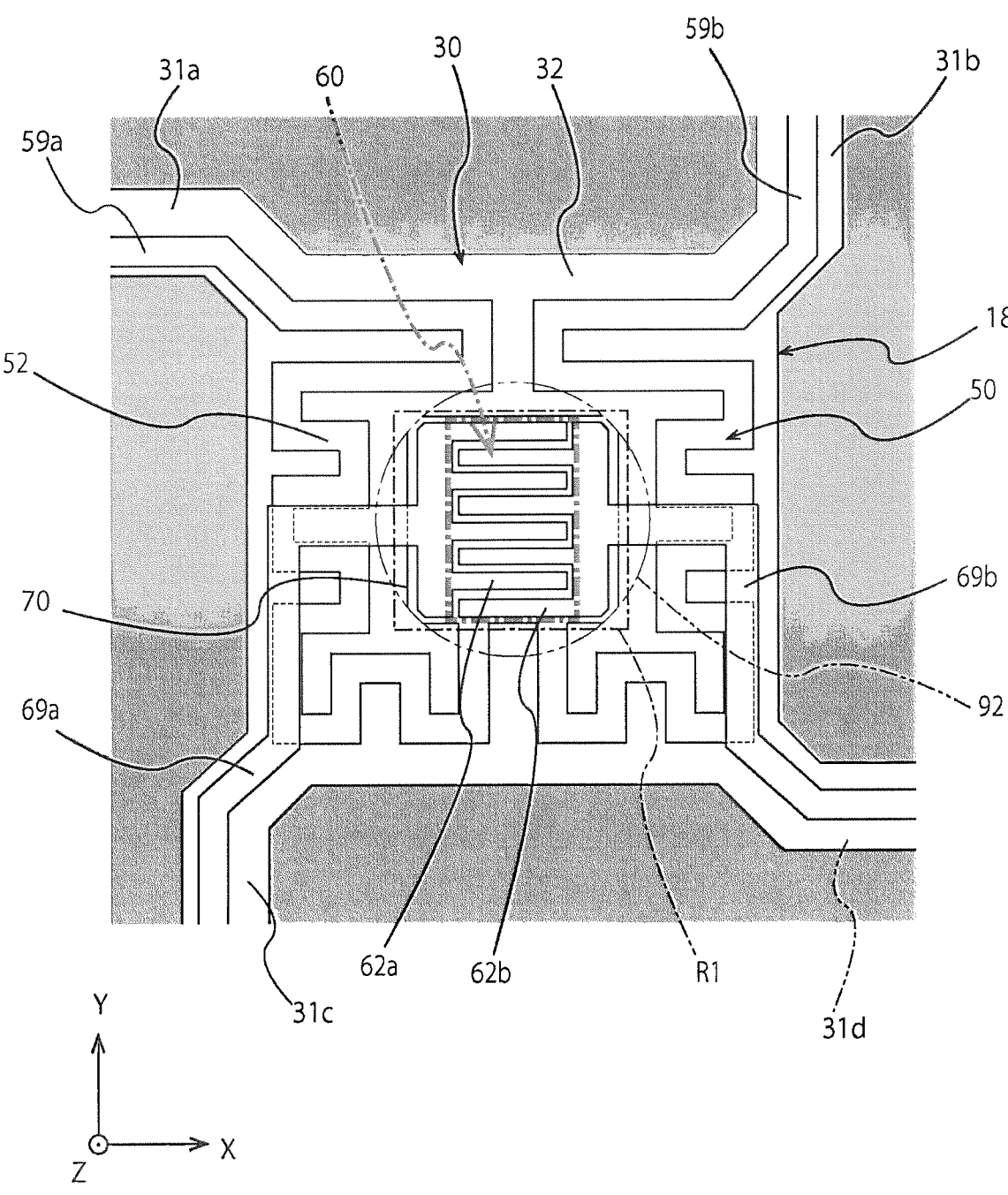
FIG. 5 is a partially enlarged view illustrating the shapes of a heater section, a gas sensor section, and the like in the gas sensor shown in FIG. 1.

As shown in FIG. 1 and FIG. 2, the gas detection section 60 is provided on the second insulating film 40 in the membrane 18. FIG. 5 is a partial view illustrating the first insulating film 30, the heater section 50, the heater wiring sections 59a and 59b, the flat section 70, the gas detection section 60, and the detection wiring section 69a and 69b on the membrane 18 and its peripheral portion in the gas sensor 10. In FIG. 5, the second insulating film 40 in the gas sensor 10 is seen through, and the semiconductor material 92 is shown only for its arrangement by an imaginary line.

As shown in FIG. 5, the gas detection section 60 is disposed in the central region R1 as a region closer to the center 34 of the first-insulating-film membrane portion 32 than the heater section 50 when viewed from above. As shown in FIG. 5, the gas detection section 60 includes the pair of electrodes 62a and 62b. As shown in FIG. 7, the pair of electrodes 62a and 62b is in contact with the semiconductor material 92.

As shown in FIG. 5, the pair of electrodes 62a and 62b faces each other in the horizontal direction with a predetermined interval and detects a resistance change of the semiconductor material 92 disposed to connect the pair of electrodes 62a and 62b. The pair of electrodes 62a and 62b has any comb-teeth shape and is arranged so that their comb-teeth and the gaps therebetween are engaged with each other. The gas detection unit 60 including the electrodes 62a and 62b having the comb-teeth shape can increase the length of the electrodes 62a and 62b facing each other within a small area and can improve the detection sensitivity.

Note that, the gas detection section 60 in the gas sensor 10 is a portion where the pair of electrodes 62a and 62b is opposed to each other, namely, a portion surrounded by a dashed line (thick line) in FIG. 5 and FIG. 7. Portions outside the portion surrounded by the dashed line in FIG. 5 are portions that do not face each other and are not contained in the gas detection section 60 or the electrodes 62a and 62b, but are contained in the detection wiring sections 69a and 69b described below.

As shown in FIG. 5, the gas sensor 10 includes a pair of detection wiring sections 69a and 69b. As shown in FIG. 7, similarly to the gas detection section 60, the pair of detection wiring sections 69a and 69b is also provided on the second insulating film 40. As shown in FIG. 5, the detection wiring section 69a is connected to the electrode 62a inside the membrane 18, and the detection wiring section 69b is connected to the electrode 62b inside the membrane 18.

As shown in FIG. 1, the detection wiring sections 69a and 69b connect the detection terminals 68a and 68b provided on the cavity peripheral portion 24 and the gas detection section 60 through the upper side of at least one of the beam portions 31a to 31d (two beam portions 31c and 31d in the embodiment) and the beam portion of the second insulating film 40 overlapping therewith.

The gas detection section 60 is disposed on at least the second insulating film 40 over the flat section 70. As shown in FIG. 5, the gas detection section 60 including the pair of electrodes 62a and 62b is disposed so as to overlap with the flat surface 72 (see FIG. 6) when viewed from above and has an area smaller than that of the flat surface 72. As shown in FIG. 7, the whole of the gas detection section 60 is formed on the second insulating film 40 over the flat surface 72 of the flat section 70 and is preferably formed within the range of the flat surface 72 when viewed from above.

As shown in FIG. 7, the second-insulating-film membrane portion 44 of the second insulating film 40 formed on the first-insulating-film membrane portion 32 includes the first portion 41 in direct contact with the top of the first-insulating-film membrane portion 32, the second portion 42 sandwiching the heater section 50 with the first-insulating-film membrane portion 32, and the third portion 43 sandwiching the flat portion 70 with the first-insulating-film membrane portion 32. The first portion 41 is lower in height than the second portion 42 and the third portion 43 sandwiching the heater section 50 and the flat section 70 with the first-insulating-film membrane portion 32. Thus, the second-insulating-film membrane portion 44 is formed with undulations and steps.

As shown in FIG. 7, since the detection wiring section 69a is formed so as to cross over the first portion 41, the second portion 42, and the third portion 43, the shape of the detection wiring section 69a itself is affected by the undulations of the underlying layers and is likely to have variations. On the other hand, since the gas detection section 60 is formed on the third portion 43 formed on the flat surface 72, the shape of the gas detection section 60 is not affected by the undulations or steps of the second-insulating-film membrane portion 44 and is less likely to have variations, and for example, the gap between the pair of electrodes 62a and 62b can be controlled precisely.

The materials of the gas detection section 60 including the pair of electrodes 62a and 62b and the detection wiring sections 69a and 69b can be conductors such as metal and are, for example, gold (Au), silver (Ag), platinum (Pt), aluminum (Al), or the like. Preferably, the gas detection section 60 and the detection wiring sections 69*a* and 69*b* are made of the same material from the viewpoint of being able to form them in the same film forming process, but the gas detection section 60 and the detection wiring sections 69*a* and 69*b* may be made of different materials.

As shown in FIG. 1 and FIG. 2, the detection terminals 68*a* and 68*b* are provided on the detection wiring sections 69*a* and 69*b* in the cavity peripheral portion 24 of the base member 20 so as to be in contact with the detection wiring sections 69*a* and 69*b*. As shown in FIG. 4, the upper surfaces of the detection terminals 68*a* and 68*b* are exposed to the upper side of the gas sensor 10 and connected with an external wiring for transmitting the output of the gas detection section 60 to the detection terminals 68*a* and 68*b*.

The materials of the detection terminals 68*a* and 68*b* are not limited as long as they are good conductors and include gold (Au), silver (Ag), platinum (Pt), aluminum (Al), etc. From the viewpoint of bondability to the external wiring, etc., the materials of the detection terminals 68*a* and 68*b* are preferably gold (Au).

(1.7. Semiconductor Material)

As shown in FIG. 7 and FIG. 5, the semiconductor material 92 is provided between the electrodes 62*a* and 62*b* of the gas detection section 60 disposed in the central region R1 of the membrane 18 and on the gas detection section 60. Preferably, the semiconductor material 92 is formed in an area larger than that of the gas detection section 60 so as to overlap with the whole of the gas detection section 60 when viewed from above. The semiconductor material 92 is in contact with both of the pair of electrodes 62*a* and 62*b* constituting the gas detection section 60. A portion of the semiconductor material 92 may be in contact with the detection wiring sections 69*a* and 69*b* connected to the gas detection section 60.

As shown in FIG. 7, the semiconductor material 92 has a substantially dome-shaped outer shape. Preferably, from the viewpoint of uniformity of temperature distribution in the semiconductor material 92, the semiconductor material 92 is approximately circular or approximately elliptical when viewed from above and is more preferably approximately circular.

The semiconductor material 92 is not limited as long as it has a resistance value that changes upon contact with a reducing gas. From the viewpoint of thermal stability and chemical stability, however, the semiconductor material 92 is preferably a metal oxide. Examples of metal oxides used for the semiconductor material 92 include tin oxide ($SnO_2$), zirconium oxide ($ZrO_2$), iron oxide ($Fe_2O_3$), tungsten oxide ($WO_3$), indium oxide ($In_2O_3$), and cobalt oxide ($Co_3O_4$). For the purpose of further increasing the sensitivity for the gas to be detected, a noble metal, such as platinum (Pt) and palladium (Pd), may be carried in the metal oxide constituting the semiconductor material 92. Moreover, these materials may be composited or alloyed.

(1.8. Manufacturing Method)

Hereinafter, an example of a manufacturing method of a gas sensor 10 is described. However, the manufacturing method of the gas sensor 10 is not limited to the following manufacturing method. First, in the manufacture of the gas sensor 10, a base material to be a raw material for a base member 20 is prepared. The base material has a flat plate shape in which a cavity 22 is not formed. Next, a first insulating film 30 is formed on one main surface of the prepared base material (a surface to be a cavity peripheral portion 24 after the cavity 22 is formed). The first insulating film 30 is formed by a known film forming method, such as a thermal oxidation method and a chemical vapor deposition (CVD) method.

A heater section 50, a flat section 70, and heater wiring sections 59*a* and 59*b* are formed on the first insulating film 30 formed. The heater section 50, the flat section 70, and the heater wiring sections 59*a* and 59*b* can be formed in the same film forming process. The shapes of the heater section 50, the flat section 70, and the heater wiring sections 59*a* and 59*b* are formed by, for example, a lift-off method. In the lift-off process, first, a resist is applied to the entire surface on which a predetermined pattern is to be formed, and the resist is exposed and developed to form a predetermined pattern shape. The development dissolves the resist corresponding to a predetermined pattern shape, and the predetermined pattern shape is patterned. After the resist is dissolved, a film of a material constituting the pattern is formed by a film forming method, such as sputtering and vapor deposition. After the film is formed, the film of the material formed on the resist is also removed by removing the remaining resist with a stripping solution, the film of the material is left only in the patterned area, and a predetermined pattern is formed.

After forming the heater section 50, the flat section 70, and the heater wiring sections 59*a* and 59*b*, the second insulating film 40 is formed by a known film forming method as in the formation of the first insulating film 30 so that at least the heater section 50, the flat section 70, and the heater wiring sections 59*a* and 59*b* are covered.

Next, a gas detection section 60 and detection wiring sections 69*a* and 69*b* are formed on the second insulating film 40. The gas detection section 60 and the detection wiring sections 69*a* and 69*b* can be formed in the same film forming process. Similarly to the heater section 50, the flat section 70, and the heater wiring sections 59*a* and 59*b*, the shapes of the gas detection section 60 and the detection wiring sections 69*a* and 69*b* are formed by a lift-off method or the like. Moreover, after forming a predetermined opening in the second insulating film 40, detection terminals 68*a* and 68*b* and heater terminals 58*a* and 58*b* are formed.

Next, among the main surfaces of the base member, an etching mask is applied to a predetermined region on a main surface of the base member on which the first insulating film 30 is not formed, and the cavity 22 is formed by etching the first insulating film 30 until the first insulating film 30 formed on the main surface on the opposite side is exposed. The first insulating film 30 corresponding to the region where the cavity 22 is formed is a first-insulating-film membrane portion 32.

Moreover, a semiconductor material 92 is formed from above a pair of electrodes 62*a* and 62*b* of the gas detection section 60 so as to be in contact with the pair of electrodes 62*a* and 62*b*, and the gas sensor 10 is obtained. In the formation process of the semiconductor material 92, the semiconductor material 92 is formed by forming a coated body using a semiconductor-material paste containing a raw material of the semiconductor material 92 and subjecting the coated body to a heat treatment at a predetermined temperature.

The semiconductor-material paste is obtained by mixing a raw material of the above-mentioned material as the semiconductor material, a solvent, a binder, and an additive. The raw material of the semiconductor material is, for example, a metal oxide powder. The average particle size of the metal oxide powder is not limited, but is preferably 0.1 to 20 μm.

(1.9. Operation)

In the gas sensor 10, the heater section 50 is connected to an external circuit (not shown) via the heater wiring sections 59a and 59b, the flat section 70, and the heater terminals 58a and 58b. Moreover, the electrodes 62a and 62b of the gas detection section 60 are connected to an external circuit (not shown) via the detection wiring sections 69a and 69b and the detection terminals 68a and 68b. When the gas sensor 10 is activated, energization is started, a predetermined voltage is applied to the heater section 50, and the gas detection section 60 and its surroundings are heated to a predetermined temperature.

When a gas to be detected is contained in the space where the gas sensor 10 is disposed, the resistance value of the semiconductor material 92 in contact with the gas detection section 60 changes depending on the amount of electron movement caused by an oxidation-reduction reaction generated between the oxygen adsorbed on the surface of the semiconductor material 92 and the gas to be detected. Since the amount of electron movement corresponds to the concentration of the gas to be detected, the concentration of the gas to be detected can be measured by detecting a change in resistance value with the electrodes 62a and 62b of the gas detection section 60. Since the change in resistance value of the semiconductor material 92 is highly sensitive even if the concentration of the gas to be detected is very low, the gas sensor 10 is favorable for detection when the concentration of the gas to be detected is low. When the concentration of the gas to be detected is high, however, the change in resistance value becomes saturated, so detection is possible, but concentration measurement becomes difficult.

In the gas sensor 10, as shown in FIG. 5 to FIG. 7, the flat section 70 including a flat surface 72 is formed inside the heater section 50, and the gas detection section 60 having an area smaller than that of the flat surface 72 is formed on the flat section 70 via the second insulating film 40. Thus, the gas detection section 60 can be formed precisely without being affected by unevenness of the shape of the underlying layers, reduce noise caused by variations in shape or so, and demonstrate a good responsiveness. Moreover, since the flat section 70 is formed with a substantially uniform thickness in the plane direction, such a gas sensor 10 also has a good process efficiency. Moreover, since the heat of the heater section 50 is transmitted to the gas detection section 60 via not only the second insulating film 40 but also the flat section 70, local temperature variations in the gas detection section 60 are reduced, and the gas sensor 10 has a good detection stability.

In the gas sensor 10, the flat surface 72 is made of the same material as the heater section 50, is connected to the heater section 50, and has a thermal conductivity higher than that of the second insulating film 40. In such a gas sensor 10, since the heat of the heater section 50 is effectively transmitted to the gas detection section 60 via the flat section 70, local temperature variations in the gas detection section 60 are further reduced, and the detection stability of the gas sensor 10 is improved.

In the gas sensor 10, since the heater section 50 has a symmetrical shape with respect to a reference line A1 passing through a center 34 of the first-insulating-film membrane portion 32 and extending in the horizontal direction, the temperature distribution of the gas detection section 60 can be uniform. Moreover, since the heater section 50 of the gas sensor 10 includes a bending portion 52 repeatedly bending at a predetermined amplitude, it is possible to effectively reduce detection errors and noise due to thermal stress generated in the first insulating film 30 and the second insulating film 40.

2. Second Embodiment

Figure 8:
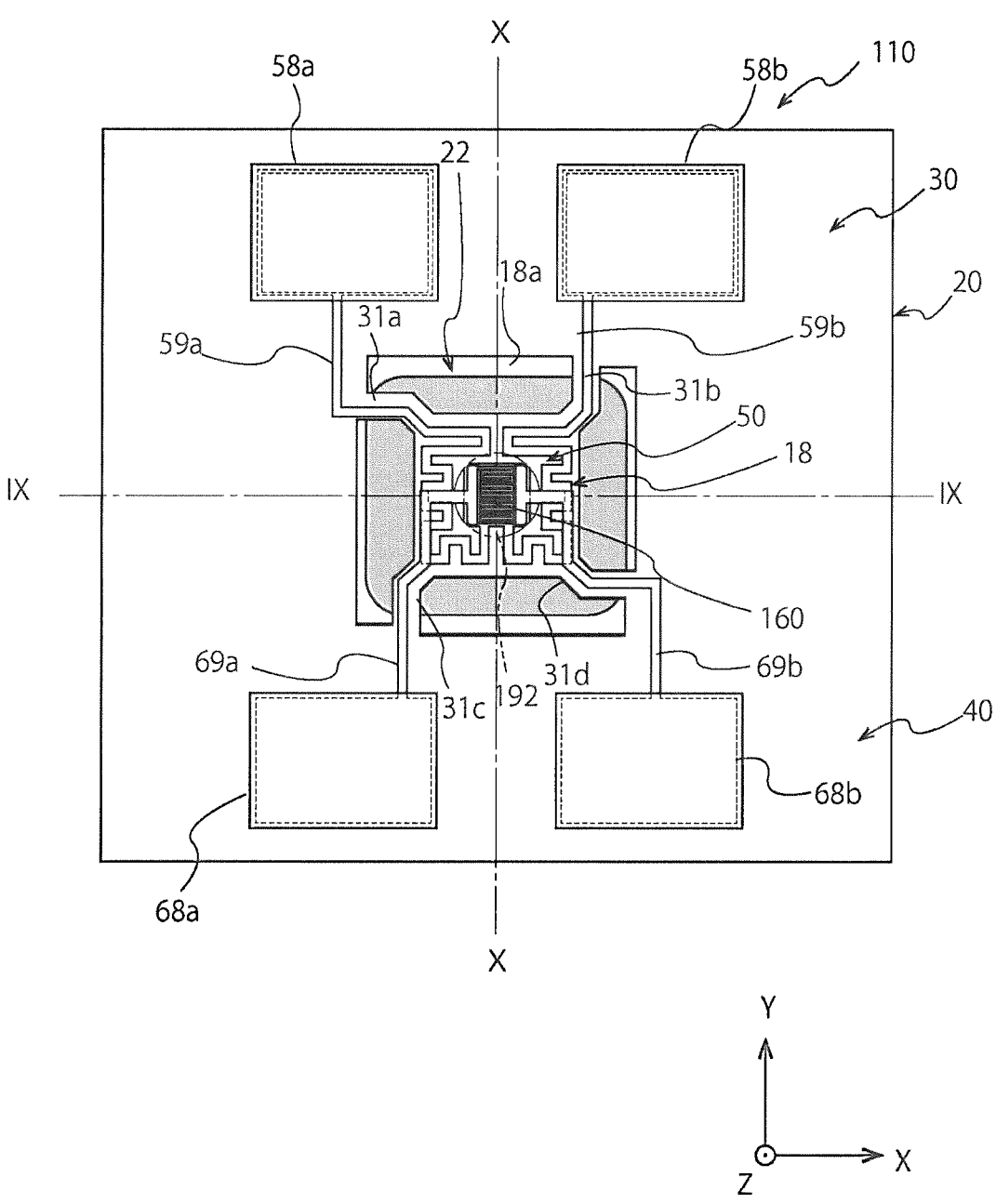
FIG. 8 is a schematic plan view of a gas sensor according to Second Embodiment of the present disclosure.

FIG. 8 is a schematic plan view illustrating a gas sensor 110 according to Second Embodiment and is a view of the gas sensor 110 seen from above. Note that, in FIG. 8, the second insulating film 40 is seen through, and a catalyst material 192 is shown only for its arrangement by an imaginary line. The gas sensor 110 according to Second Embodiment is different from the gas sensor 10 according to First Embodiment in that a gas detection section 160 includes a Pt wire 165 (see FIG. 11) in contact with the catalyst material 192, and that gas is detected based on resistance change of the Pt wire 165. As for sections other than the gas detection section 160 and the catalyst material 192, however, the gas sensor 110 is similar to the gas sensor 10 according to First Embodiment. As for the gas sensor 110, the differences from the gas sensor 10 are mainly explained, and the common matters with the gas sensor 10 are provided with the same reference numerals and are not explained.

Figure 9:
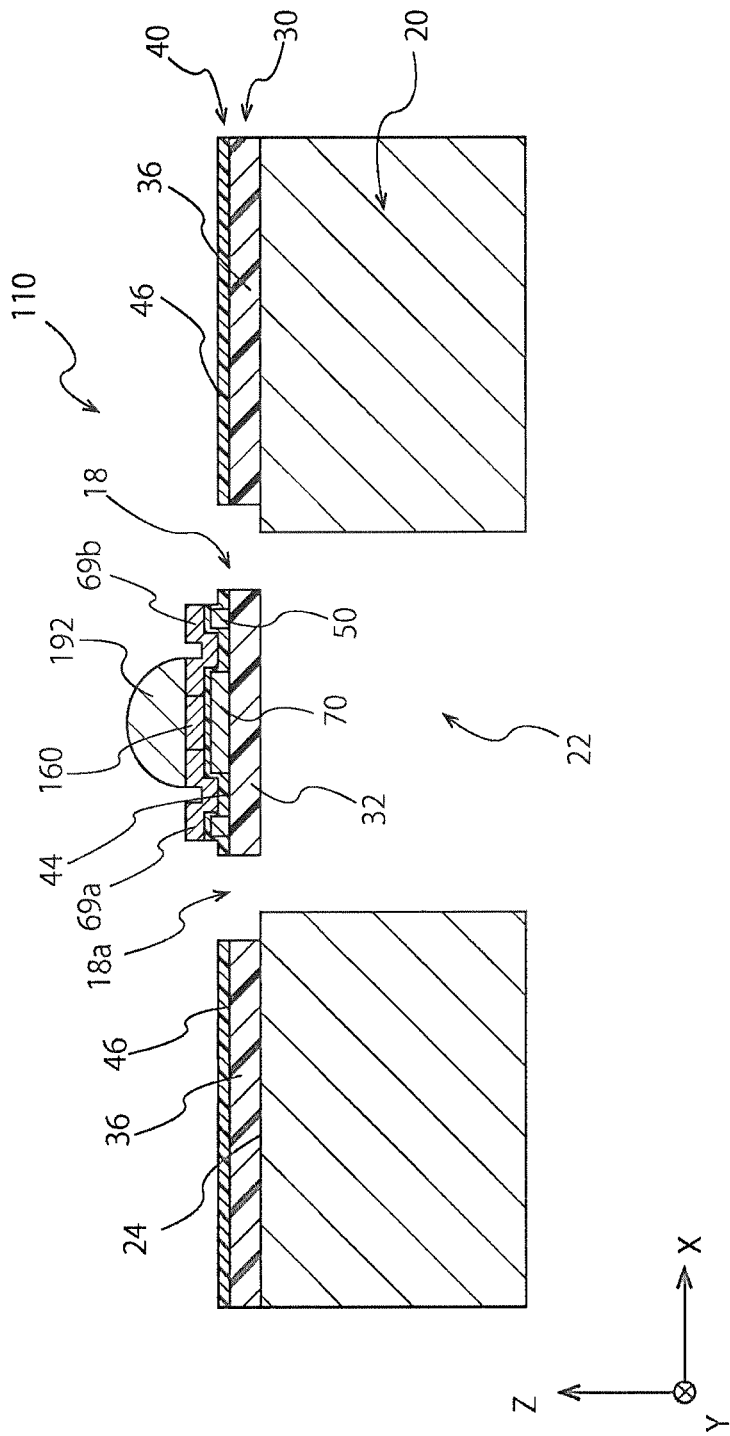
FIG. 9 is a schematic cross-sectional view of the gas sensor shown in FIG. 8 along IX-IX.
Figure 10:
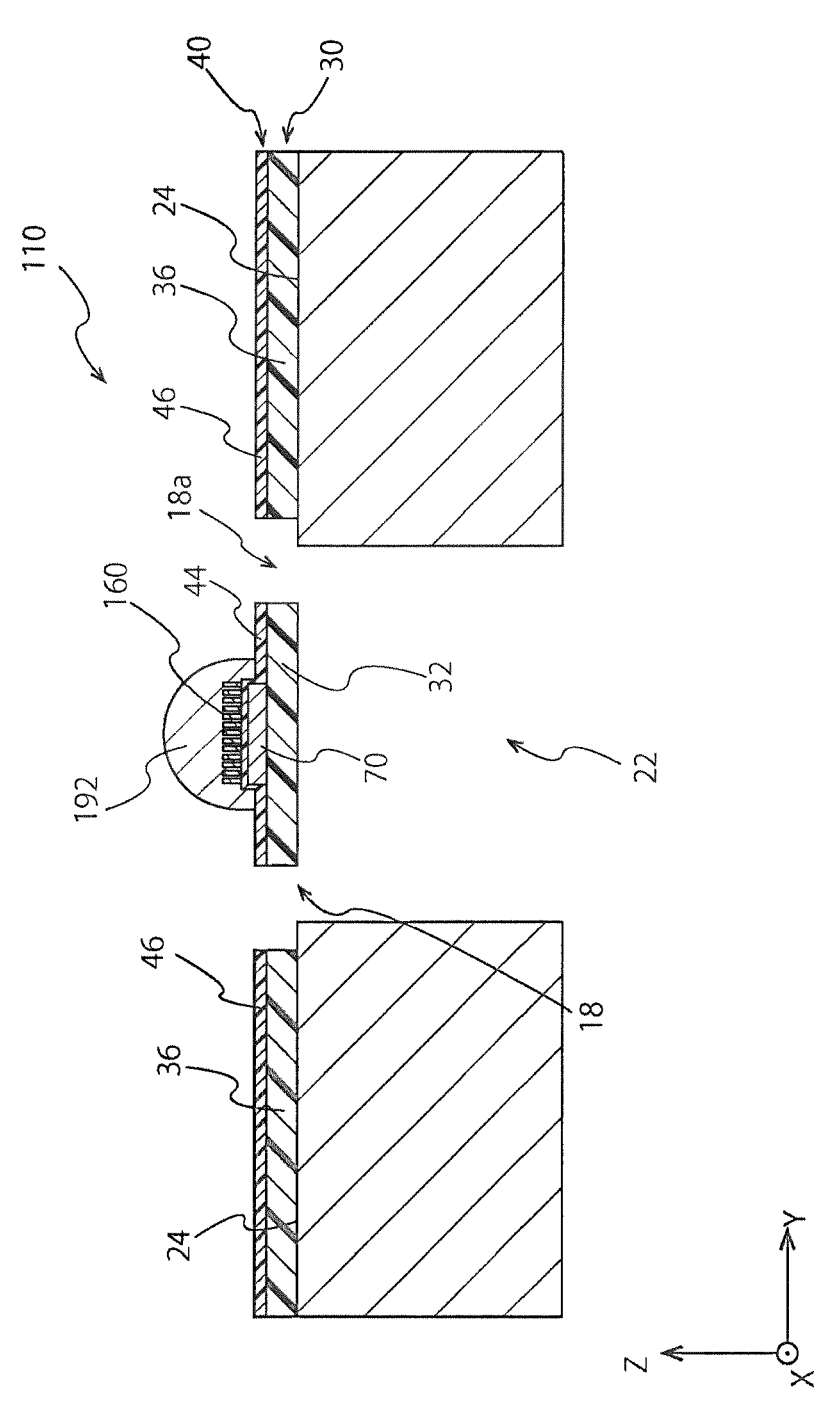
FIG. 10 is a schematic cross-sectional view of the gas sensor shown in FIG. 8 along X-X.

FIG. 9 is a schematic cross-sectional view of the gas sensor 110 taken along a plane along the line IX-IX in FIG. 8, and FIG. 10 is a schematic cross-sectional view of the gas sensor 110 taken along a plane along the line X-X in FIG. 8. The gas sensor 110 includes the base member 20, the first insulating film 30, the second insulating film 40, the heater section 50, the gas detection section 160, the heater terminals 58a and 58b, the heater wiring sections 59a and 59b, the detection terminals 68a and 68b, the detection wiring sections 69a and 69b, the flat section 70, the catalyst material 192, and the like. As for the structure below the second insulating film 40, such as the base material 20, the first insulating film 30, the second insulating film 40, the heater section 50, the heater terminals 58a and 58b, the heater wiring sections 59a and 59b, the detection terminals 68a and 68b, and the flat section 70, the gas sensor 110 is similar to the gas sensor 10 according to First Embodiment.

Figure 11:
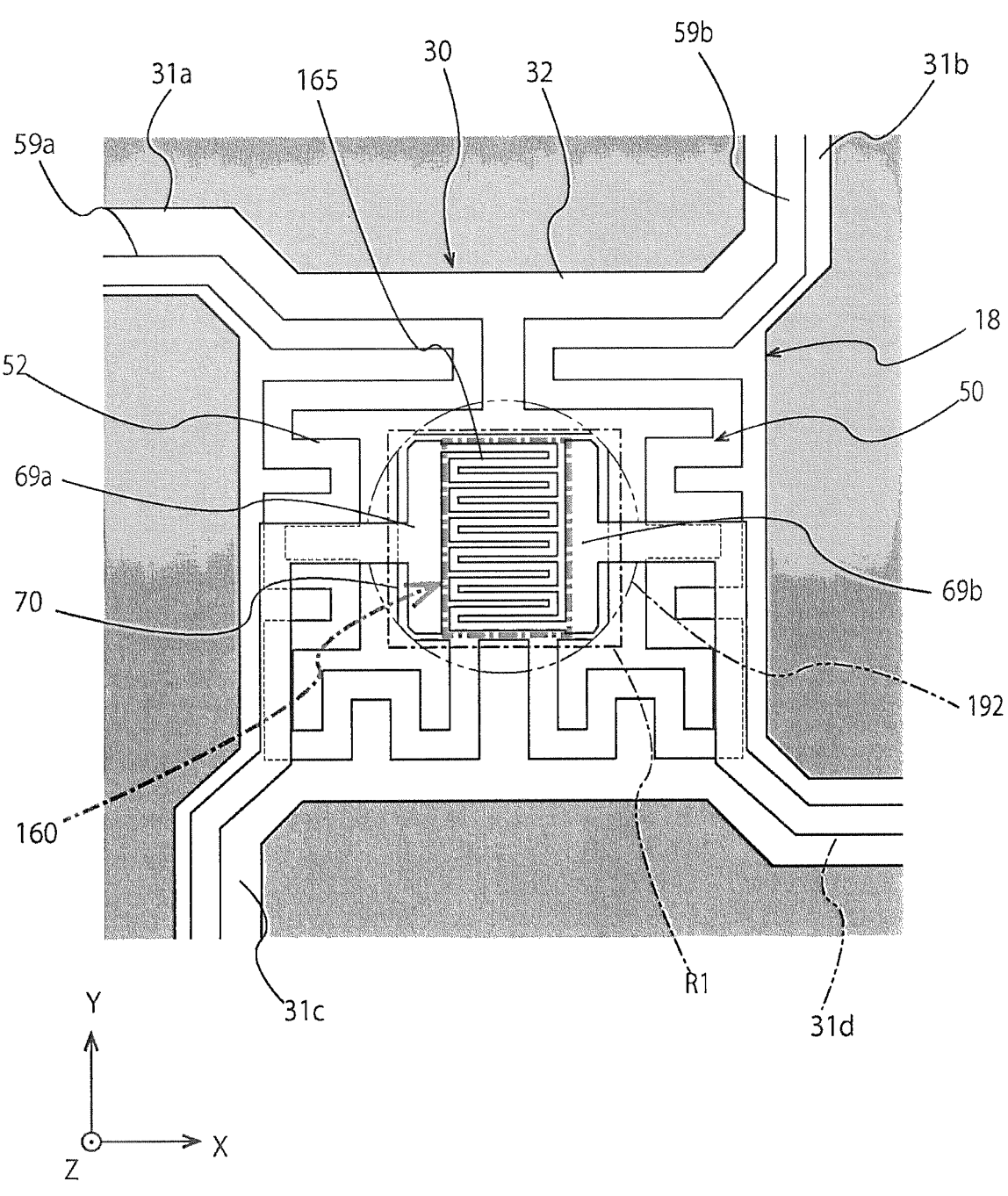
FIG. 11 is a partially enlarged view illustrating the shapes of a heater section, a gas sensor section, and the like in the gas sensor shown in FIG. 8.

As shown in FIG. 8 and FIG. 9, the gas detection section 160 is provided on the second insulating film 40 in the membrane 18. FIG. 11 is a partial view illustrating the first insulating film 30, the heater section 50, the heater wiring sections 59a and 59b, the flat section 70, the gas detection section 160, and the detection wiring section 69a and 69b on the membrane 18 and its peripheral portion in the gas sensor 110. In FIG. 11, the second insulating film 40 in the gas sensor 110 is seen through, and the catalyst material 192 is shown only for its arrangement by an imaginary line.

Similarly to the gas detection section 60 shown in FIG. 5, as shown in FIG. 11, the gas detection section 160 is disposed in the central region R1 as a region closer to the center of the first-insulating-film membrane portion 32 than the heater section 50 when viewed from above. Instead of the electrodes 62a and 62b having a comb-teeth shape shown in FIG. 5, the gas detection section 160 of the gas sensor 110 includes a Pt wire 165. The Pt wire 165 is a thin film of platinum (Pt) formed into a meandering pattern. The gas detection section 160 including such a meandering Pt wire 165 can increase the length of the Pt wire 165 in contact with the catalyst material 192 within a small area and can improve detection sensitivity.

One end of the Pt wire 165 is connected to the detection wiring section 69a, and the other end of the Pt wire 165 is connected to the detection wiring section 69b. Note that, the fact that the detection wiring sections 69a and 69b connect the gas detection section 160 disposed on the membrane 18 and the detection terminals 68a and 68b arranged on the cavity peripheral portion 24 is similar to the gas sensor 10 according to First Embodiment. Moreover, the materials of the detection wiring sections 69a and 69b may be platinum (Pt) as in the gas detection section 160 or may be other conductive materials such as gold (Au).

Figure 12:
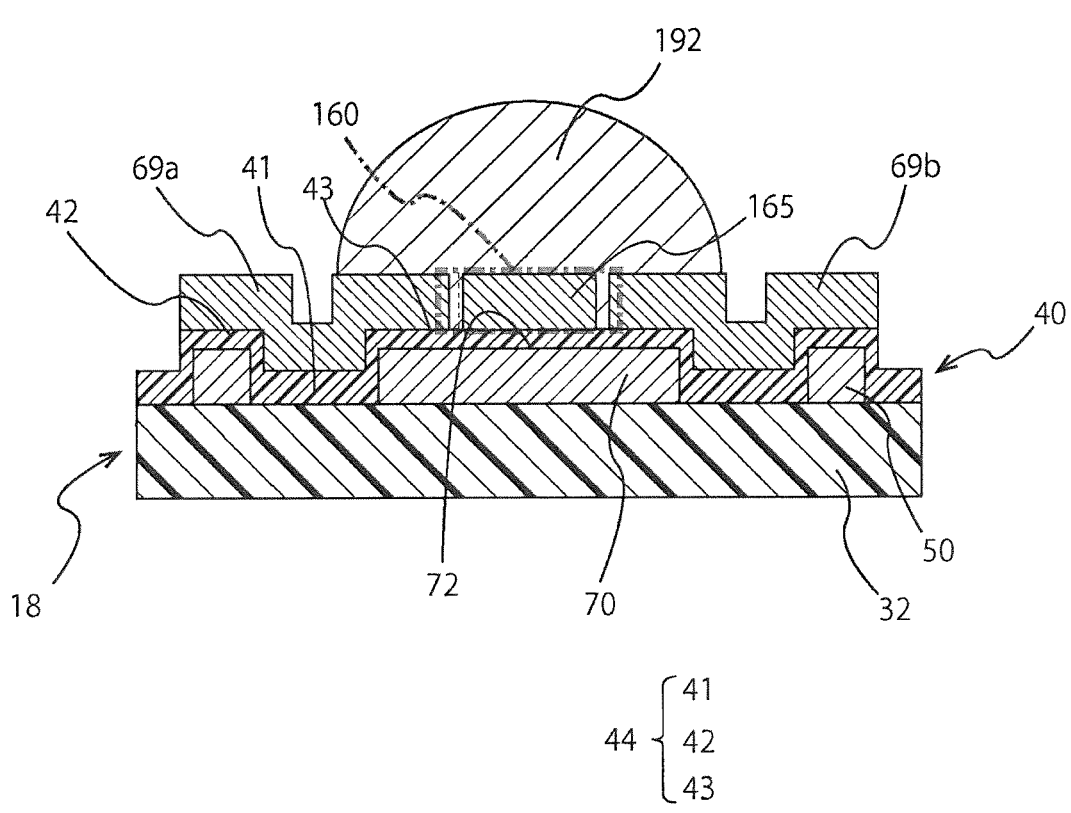
FIG. 12 is an enlarged cross-sectional view illustrating a section of the gas sensor shown in FIG. 9 disposed on the upper side of a cavity.

FIG. 12 is an enlarged cross-sectional view of a section of the gas sensor 110 shown in FIG. 9 disposed on the upper side of the cavity 22. As shown in FIG. 12, the gas detection section 160 including the Pt wire 165 is disposed so as to overlap with the flat surface 72 (see FIG. 11) when viewed from above and has an area smaller than that of the flat surface 72. As shown in FIG. 12, the whole of the gas detection section 160 is formed on the flat surface 72 of the flat section 70 via the second insulating film 40 and is preferably formed within the range of the flat surface 72 when viewed from above. Note that, the gas detection section 160 in the gas sensor 110 ranges from one end to the other end of the Pt wire 165 and is namely the portion surrounded by a dashed line (thick line) in FIG. 11.

Since the gas detection section 160 shown in FIG. 12 is formed on the third portion 43 formed on the flat surface 72, the shape of the gas detection section 60 is not affected by the undulations or steps of the second-insulating-film membrane portion 44 and is less likely to have variations. Thus, for example, the line width, overall length, and cross-sectional area of the Pt wire 165 can also be controlled precisely.

As shown in FIG. 12, the catalyst material 192 is provided between the Pt wire 165 of the gas detection section 160 disposed in the central region R1 of the membrane 18 and on the gas detection section 160. Preferably, the catalyst material 192 is formed in an area larger than that of the gas detection section 160 so as to overlap with the whole of the gas detection section 160 when viewed from above and be in contact with the whole of the Pt wire 165. The catalyst material 192 has a substantially dome-shaped outer shape, but the shape of the catalyst material 192 is not limited.

The material constituting the catalyst material 192 is not limited as long as it is a material known as a catalyst for a gas sensor. Normally, a carrier on which noble metal particles are carried is employed. Examples of the carrier include oxide materials, such as aluminum oxide (γ-alumina, etc.) and silicon oxide. Examples of the noble metal particles carried by the carrier include noble metal particles of platinum (Pt), palladium (Pd), ruthenium (Ru), rhodium (Rh), etc.

As with the gas detection section 60 of the gas sensor 10, the gas detection section 160 of the gas sensor 110 is formed by a known film forming method, a lift-off process, and the like. Also, as with the semiconductor material 92 of the gas sensor 10, the catalyst material 192 is formed by paste application, heat treatment, and the like.

In the catalyst material 192 included in the gas sensor 110, when a gas to be detected is contained in the space in which the gas sensor is disposed, flammable gas and oxygen, etc. combine on the catalyst material 192 and burn depending on the proportion of the gas to be detected. The Pt wire 165 of the gas detection unit 160 included in the gas sensor 110 detects a temperature change due to combustion of flammable gas generated in the catalyst material based on its resistance change.

In the gas sensor 110, as with the gas sensor 10, the gas detection section 160 having an area smaller than that of the flat surface 72 is formed on the flat section 70. Thus, the gas detection section 160 can be formed precisely without being affected by unevenness of the shape of the underlying layers, reduce noise caused by variations in shape or so, and demonstrate a good responsiveness. Moreover, in the gas sensor 110, since the heat of the heater section 50 is transmitted to the gas detection section 160 via the flat section 70, local temperature variations in the gas detection section 160 are reduced, and the detection stability is improved.

As for the common matters with the gas sensor 10 according to First Embodiment, the gas sensor 110 demonstrates effects similar to those of the gas sensor 10.

3. Third Embodiment

Figure 13:
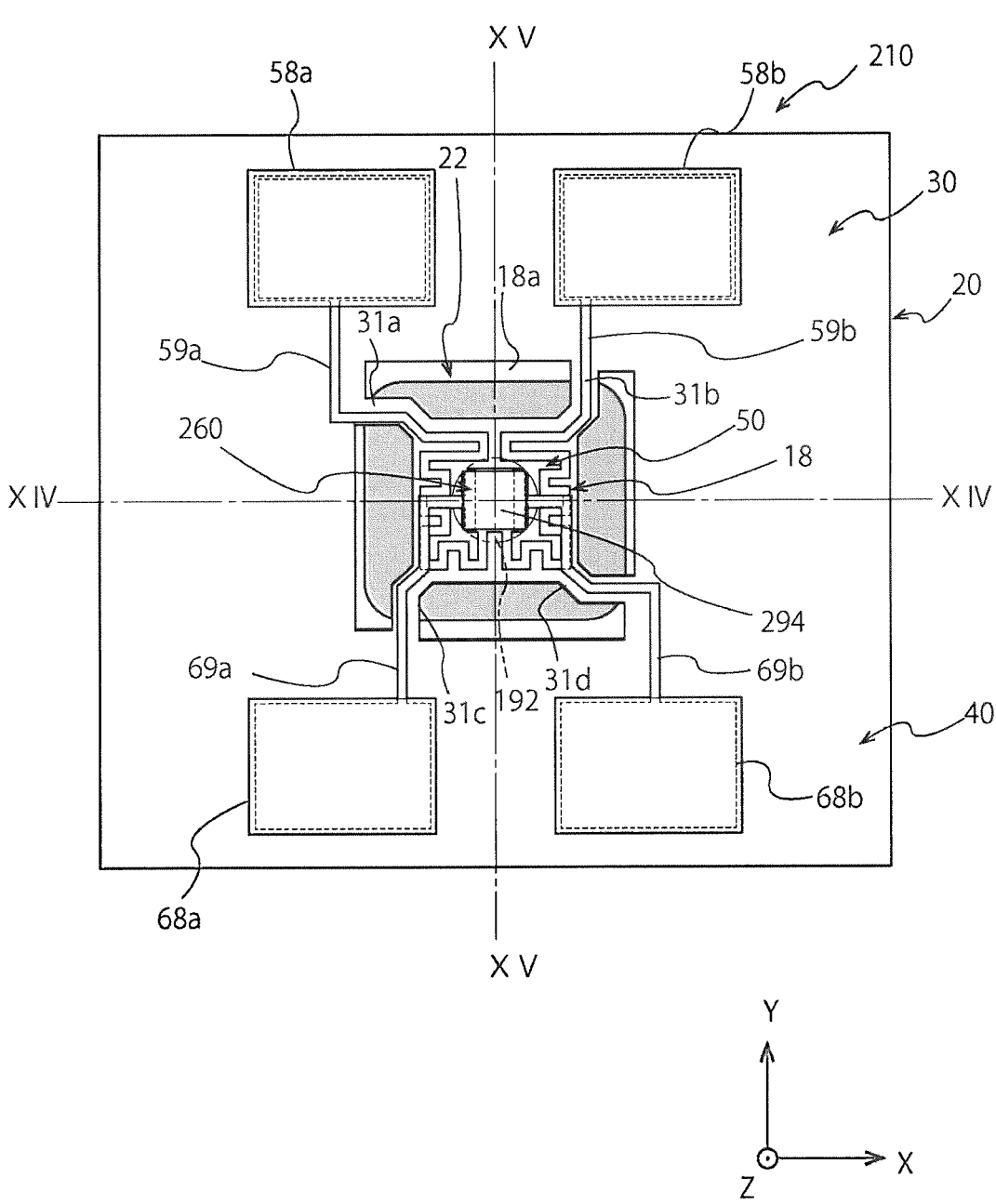
FIG. 13 is a schematic plan view of a gas sensor according to Third Embodiment of the present disclosure.

FIG. 13 is a schematic plan view illustrating a gas sensor 210 according to Third Embodiment and is a view of the gas sensor 210 seen from above. Note that, in FIG. 13, the second insulating film 40 is seen through, and a catalyst material 192 is shown only for its arrangement by an imaginary line. The gas sensor 210 according to Third Embodiment is different from the gas sensor 10 according to First Embodiment in that a gas detection section 260 includes a pair of electrodes 262a and 262b (see FIG. 16) in contact with a thermistor film 294 (in contact with the catalyst material 192), and that gas is detected based on resistance change due to catalytic reaction heat of the thermistor film 294 detected by the electrodes 262a and 262b. As for sections other than the gas detection section 260, the thermistor film 294, and the catalyst material 192, however, the gas sensor 210 is similar to the gas sensor 10 according to First Embodiment. As for the gas sensor 210, the differences from the gas sensor 10 are mainly explained, and the common matters with the gas sensor 10 are provided with the same reference numerals and are not explained.

Figure 14:
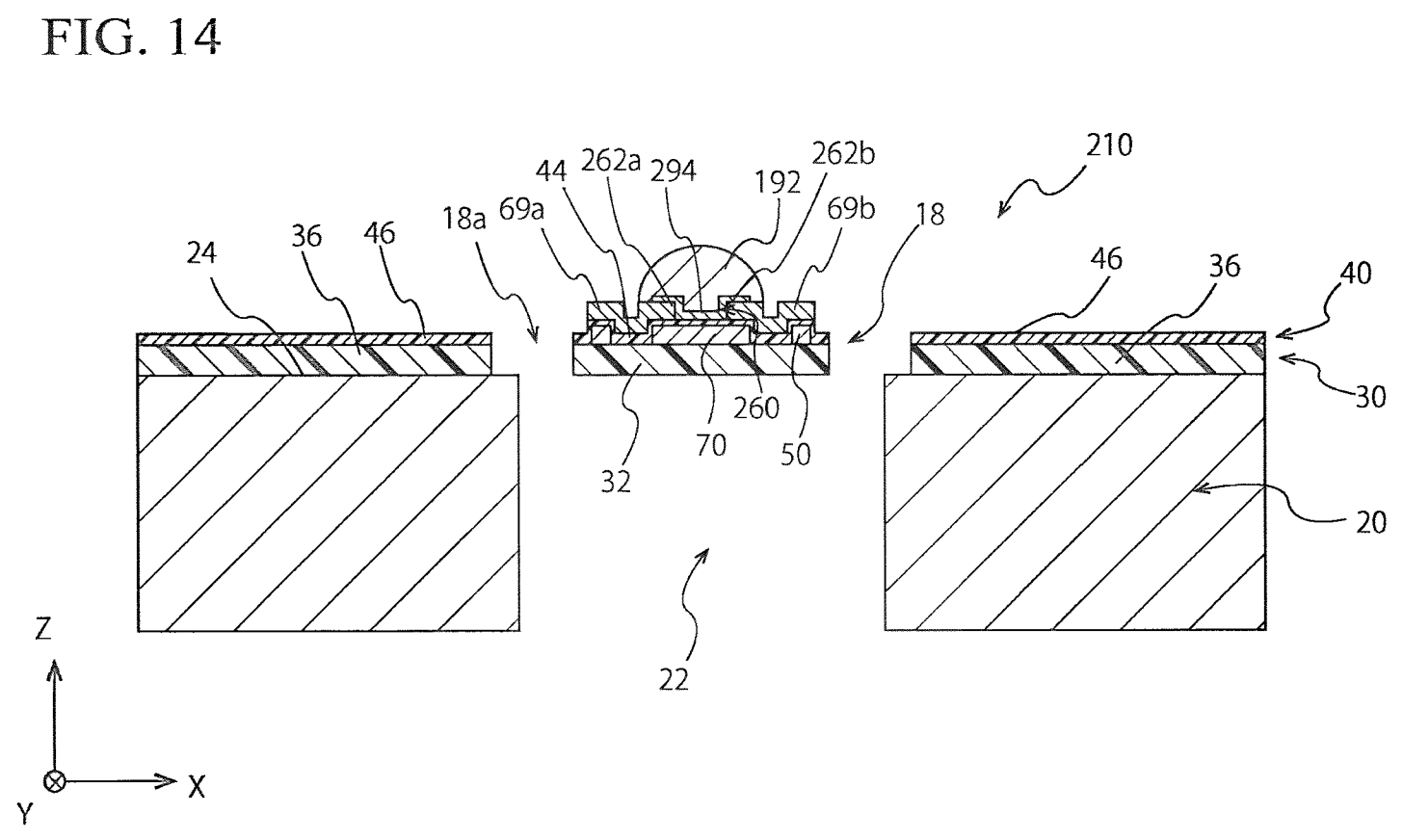
Figure 15:
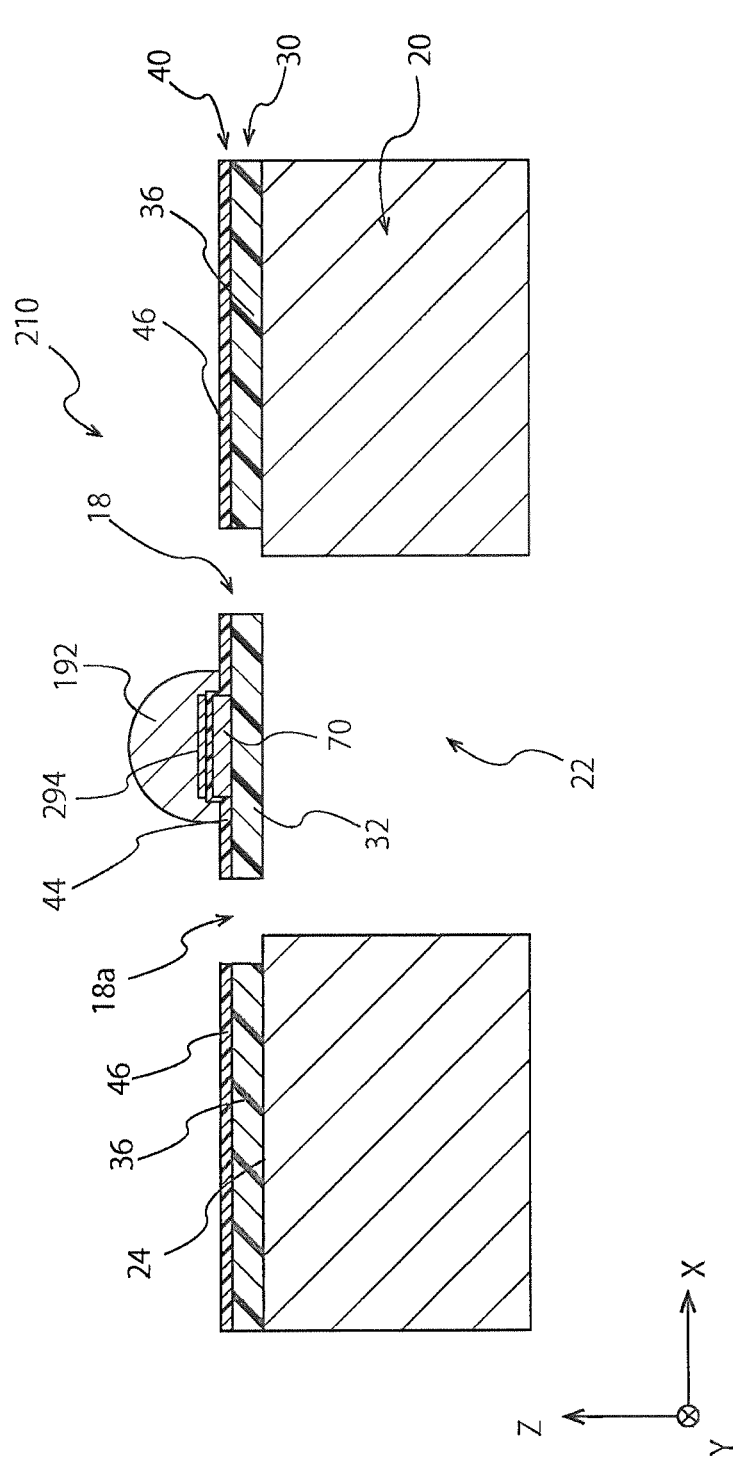
FIG. 15 is a schematic view of the gas sensor shown in FIG. 13 along XV-XV.

FIG. 14 is a schematic cross-sectional view of the gas sensor 210 taken along a plane along the line XIV-XIV in FIG. 13, and FIG. 15 is a schematic cross-sectional view of the gas sensor 210 taken along a plane along the line XV-XV in FIG. 13. The gas sensor 210 includes the base member 20, the first insulating film 30, the second insulating film 40, the heater section 50, the gas detection section 260, the heater terminals 58a and 58b, the heater wiring sections 59a and 59b, the detection terminals 68a and 68b, the detection wiring sections 69a and 69b, the flat portion 70, the thermistor film 294, the catalyst material 192, and the like. As for the structure below the second insulating film 40, such as the base member 20, the first insulating film 30, the second insulating film 40, the heater section 50, the heater terminals 58a and 58b, the heater wiring sections 59a and 59b, the detection terminals 68a and 68b, and the flat section 70, the gas sensor 210 is similar to the gas sensor 10 according to First Embodiment.

Figure 16:
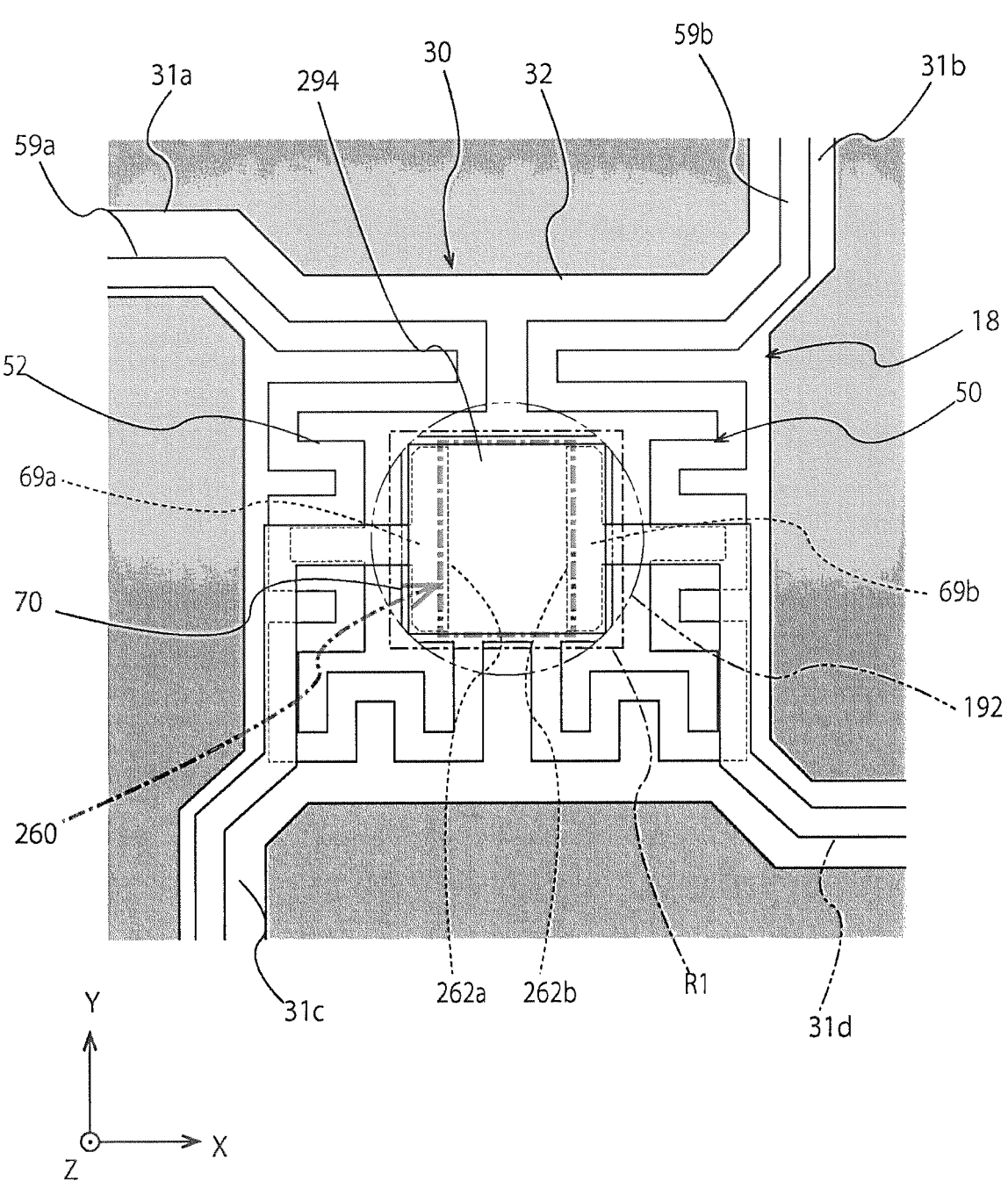
FIG. 16 is a partially enlarged view illustrating the shapes of a heater section, a gas sensor section, and the like in the gas sensor shown in FIG. 13.

As shown in FIG. 14 and FIG. 15, the gas detection section 260 is provided on the second insulating film 40 in the membrane 18. FIG. 16 is a partial view illustrating the first insulating film 30, the heater section 50, the heater wiring sections 59a and 59b, the flat section 70, the gas detection section 260, the thermistor film 294, and the detection wiring section 69a and 69b on the membrane 18 and its peripheral portion in the gas sensor 210. In FIG. 16, the second insulating film 40 in the gas sensor 210 is seen through, and the catalyst material 192 is shown only for its arrangement by an imaginary line.

Similarly to the gas detection section 60 shown in FIG. 5, as shown in FIG. 16, the gas detection section 260 is disposed in the central region R1 as a region closer to the center of the first-insulating-film membrane portion 32 than the heater section 50 when viewed from above. Instead of the electrodes 62a and 62b having a comb-teeth shape shown in FIG. 5, the gas detection section 260 of the gas sensor 210 includes a pair of electrodes 262a and 262b in contact with the thermistor film 294.

As shown in FIG. 16, the pair of electrodes 262a and 262b is substantially linear and faces each other in the horizontal direction with a predetermined interval therebetween. The thermistor film 294 is formed so as to straddle the pair of electrodes 262a and 262b and is in contact with both of the pair of electrodes 262a and 262b. The electrode 262a of the gas detection section 260 is connected to the detection wiring section 69a, and the electrode 262b of the gas detection section 260 is connected to the detection wiring section 69b. Note that, the fact that the detection wiring sections 69a and 69b connect the gas detection section 260 disposed on the membrane 18 and the detection terminals 68a and 68b arranged on the cavity peripheral portion 24 is similar to the gas sensor 10 according to First Embodiment. The materials of the electrodes 262a and 262b in the gas detection section 260 are similar to those of the electrodes 26a and 26b of the gas sensor 10.

Figure 17:
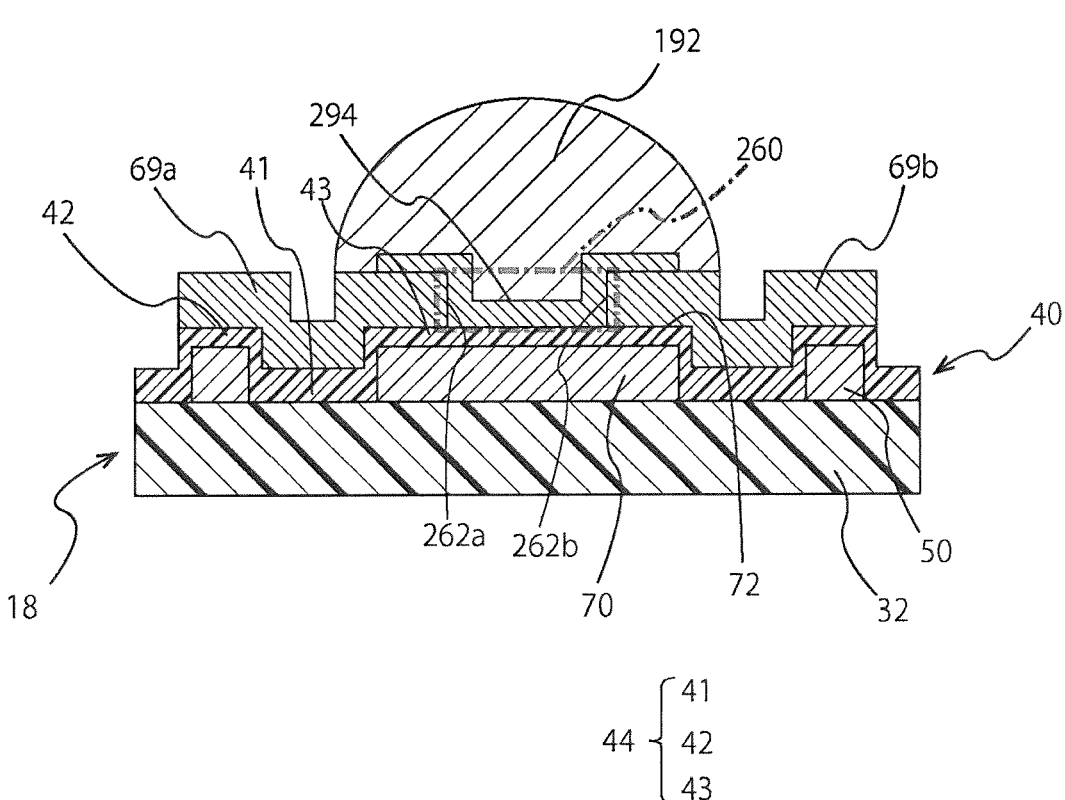
FIG. 17 is an enlarged cross-sectional view illustrating a section of the gas sensor shown in FIG. 14 disposed on the upper side of a cavity.

FIG. 17 is an enlarged cross-sectional view of a section of the gas sensor 210 shown in FIG. 14 disposed on the upper side of the cavity 22. As shown in FIG. 17, the gas detection section 260 including the pair of electrodes 262a and 262b is disposed so as to overlap with the flat surface 72 (see FIG. 16) when viewed from above and has an area smaller than that of the flat surface 72. As shown in FIG. 17, the whole of the gas detection section 260 is formed on the flat surface 72 of the flat section 70 via the second insulating film 40 and is preferably formed within the range of the flat surface 72 when viewed from above. Note that, the gas detection section 260 in the gas sensor 210 is the electrodes 262a and 262b facing each other with the thermistor film 294 interposed therebetween and is a section surrounded by a dashed line (thick line) in FIG. 16 and FIG. 17.

As shown in FIG. 17, the thermistor film 294 is disposed between the electrodes 262a and 262b constituting the gas detection section 260 and on the gas detection section 260. That is, a part of the thermistor film 294 is in contact with the second insulating film 40 (the third portion 43 of the second-insulating-film membrane portion 44) between the electrodes 262a and 262b. Another part of the thermistor film 294 is also in contact with the detection wiring sections 69a and 69b connected to the outside of the electrodes 262a and 262b.

The thermistor membrane 294 is in contact with the catalytic material 192 provided on the thermistor membrane 294. The thermistor film 294 has a negative temperature coefficient of resistance. The thermistor film 294 is thermally connected to the catalyst material 192, and the thermal conductivity of the thermistor film 294 changes due to a temperature change caused by combustion of flammable gas in the catalyst material 192. According to this, the resistance value of the thermistor film 294 changes. The material constituting the thermistor film 294 is not limited as long as it can be used as a thermistor and is, for example, a composite metal oxide containing metal elements, such as manganese (Mn), nickel (Ni), cobalt (Co), and iron (Fe). The thermistor film 294 is formed by a known film forming method, such as sputtering.

In the catalyst material 192 included in the gas sensor 210, when a gas to be detected is contained in the space in which the gas sensor 210 is disposed, flammable gas and oxygen, etc. combine and burn on the catalyst material 192 depending on the proportion of the gas to be detected. The electrodes 262a and 262b of the gas detection section 260 included in the gas sensor 210 detect a resistance change of the thermistor film 294 due to combustion heat generated in the catalyst material 192 due to combustion of flammable gas. Such a gas sensor 210 is particularly favorable for detection when the gas to be detected has a high concentration because it becomes easier to detect a resistance change of the thermistor film 294 when the gas to be detected has a high concentration.

In the gas sensor 210, as with the gas sensor 10, the gas detection section 260 having an area smaller than that of the flat surface 72 is formed on the flat section 70. Thus, the gas detection section 260 can be formed precisely without being affected by unevenness of the shape of the underlying layers, reduce noise caused by variations in shape or so, and demonstrate a good responsiveness. Moreover, since the heat of the heater section 50 is transmitted to the gas detection section 60 via the flat section 70, local temperature variations in the gas detection section 60 are reduced, and the detection stability of the gas sensor 210 is improved.

Note that, as with the electrodes 62a and 62b of the gas sensor 10, the electrodes 262a and 262b of the gas sensor 210 may have a comb-teeth shape. The gas sensor 210 may not include the catalyst material 192 and may detect gas based on resistance change of a thermistor film in contact with the electrodes 262a and 262b. As for the common matters with the gas sensor 10 according to First Embodiment, the gas sensor 210 demonstrates effects similar to those of the gas sensor 10.

4.1. First Modified Example

Figure 18:
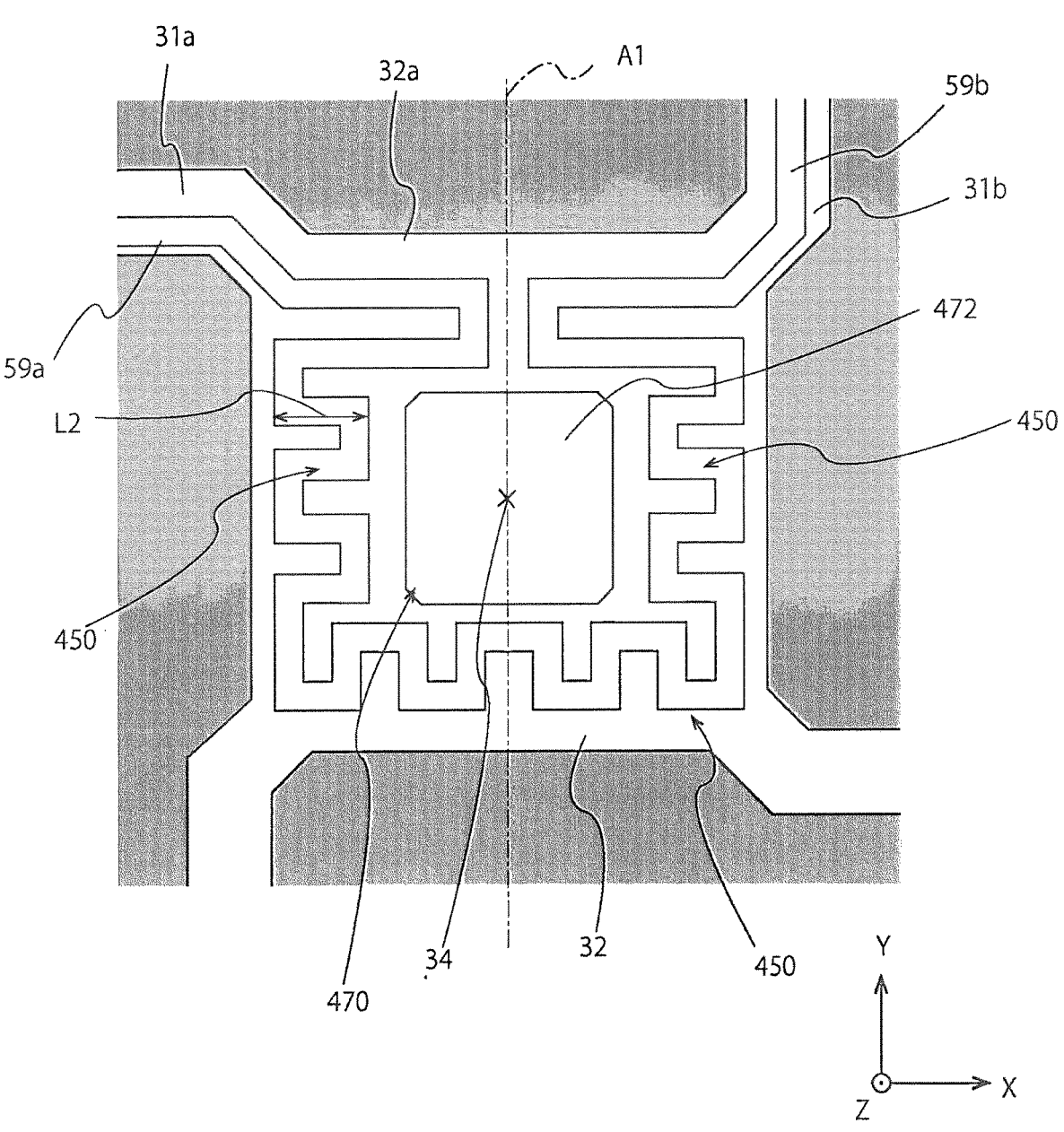
FIG. 18 is a partially enlarged view illustrating the shapes of a flat section, a heater section, and the like according to First Modified Example.

In the gas sensors 10, 110, and 210 described above, the heater section 50 and flat section 70 having shapes as shown in FIG. 6 are used, but various shapes other than those shown in FIG. 5 are conceivable for the heater section 50 and flat section 70 used in the gas sensors 10, 110, and 210. FIG. 18 is a partial explanatory diagram illustrating a heater section 450 and a flat section 470 according to First Modified Example together with the first insulating film 30, the heater wiring sections 59a and 59b, and the like on the membrane 18 and its peripheral portion.

As shown in FIG. 18, the heater section 450 according to First Modified Example is not connected to the flat section 470. In the heater section 450, a portion connected to the heater wiring section 59a and a portion connected to the heater wiring section 59b are substantially symmetrical, and these two portions are connected directly. The material of the heater section 450 is similar to that of the heater section 50 shown in FIG. 5.

The flat section 470 includes a flat surface 472 facing upward as in the flat section 70 shown in FIG. 6 and has a shape and an arrangement similar to those of the flat section 70. However, the flat section 470 is separated from the heater section 450 disposed so as to surround the flat section 470, and the electric current flowing through the heater section 450 does not pass through the flat section 470.

The material of the flat section 470 may be similar to the material of the heater section 450. Since the flat section 470 is separated from the heater section 450, however, the material of the flat section 470 can easily be made of a material different from that of the heater section 450. For example, the flat section 470 may be made of a material having a thermal conductivity higher than that of the heater section 450.

The flat section 470 is not connected to the heater section 450, but favorably functions as a conduction path for transmitting heat to the gas detection sections 60, 160, and 260. Moreover, as with the flat surface 72 shown in FIG. 5, the flat surface 472 of the flat section 470 reduces variations in the shapes of the gas detection sections 60, 160, and 260 as upper layers and contributes to improvement in the responsiveness of the gas sensor. Thus, instead of the heater section 50 and flat section 70 shown in FIG. 5, the gas sensor using the heater section 450 and the flat section 470 according to First Modified Example also demonstrates effects similar to those of the gas sensors 10, 110, and 210.

4.2. Second Modified Example

Figures 19A, 19B, 19C:
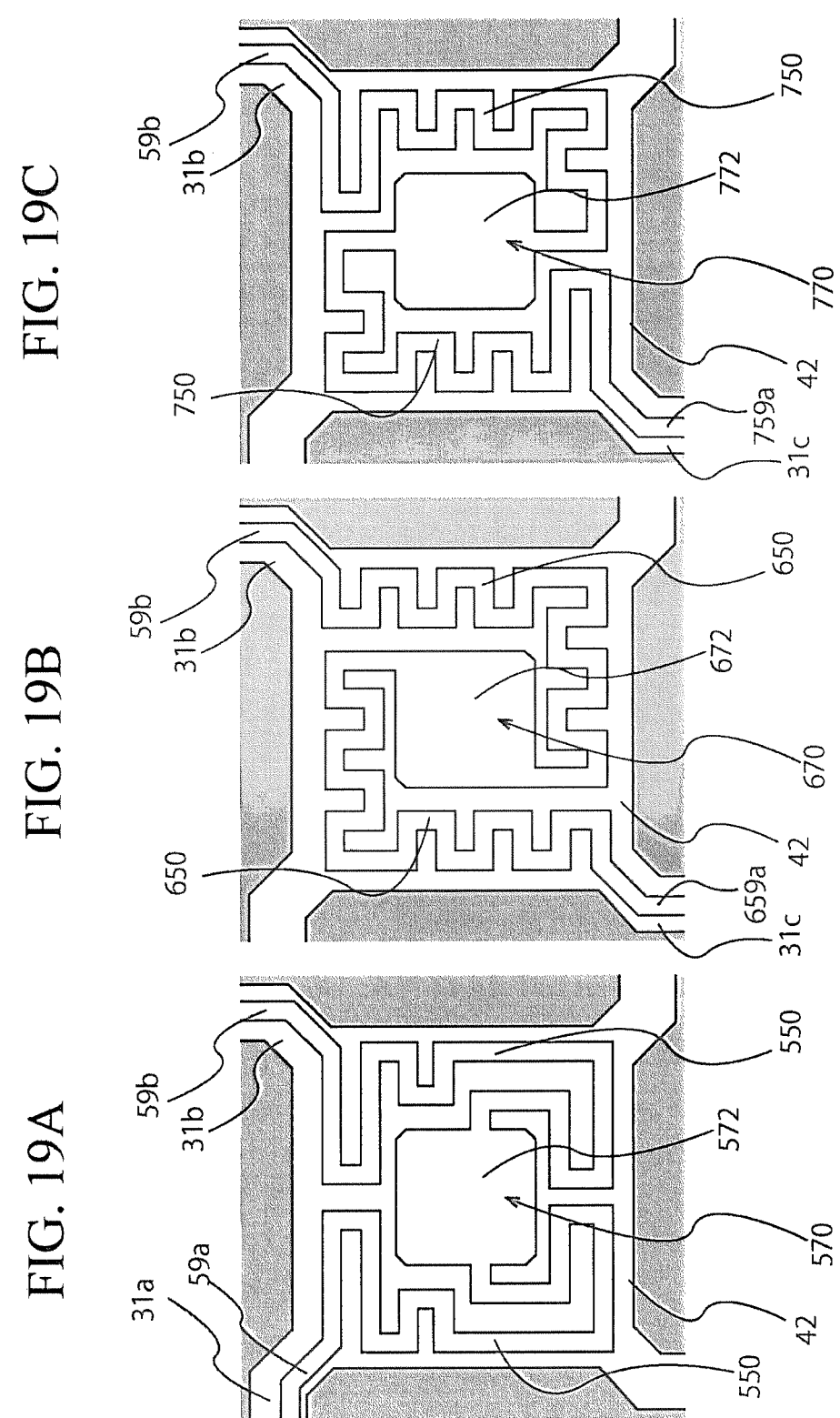
FIG. 19A to FIG. 19C are partially enlarged views illustrating the shapes of a flat section, a heater section, and the like according to Second to Fourth Modified Examples.

FIG. 19A is a partial explanatory diagram illustrating a heater section 550 and a flat section 570 according to Second Modified Example together with the first insulating film 30, the heater wiring sections 59a and 59b, and the like on the membrane 18 and its peripheral portion. As shown in FIG. 19A, similarly to the heater section 50 shown in FIG. 5, the heater section 550 according to Second Modified Example is connected to the flat section 570.

In the heater section 550, a portion connected to the heater wiring section 59a and a portion connected to the heater wiring section 59b are approximately symmetrical, and these two portions are electrically connected via the conductive flat section 570. The heater section 550 is connected to the flat section 570 at two central positions of the flat section 570 in the Y-axis direction. Note that, the bending portion of the heater section 550 is formed by combining a plurality of portions having different amplitudes, and that such a heater section 550 also demonstrates effects similar to those of the heater section 50.

The flat section 570 includes a flat surface 572 facing upward as in the flat section 70 shown in FIG. 6 and has a shape and an arrangement similar to those of the flat section 70. The materials of the heater section 550 and the flat section 570 are similar to those of the heater section 50 and the flat section 70 shown in FIG. 5.

The gas sensor using the heater section 550 and the flat section 570 according to Second Modified Example instead of the heater section 50 and flat section 70 shown in FIG. 5 also demonstrates effects similar to those of the gas sensors 10, 110, and 210.

4.3. Third Modified Example

FIG. 19B is a partial explanatory diagram illustrating a heater section 650 and a flat section 670 according to Third Modified Example together with the first insulating film 30, the heater wiring sections 59a and 59b, and the like on the membrane 18a and its peripheral portion. As shown in FIG. 19B, similarly to the heater section 50 shown in FIG. 5, the heater section 650 according to Third Modified Example is connected to the flat section 670.

In the heater section 650, a portion connected to the heater wiring section 659a passing over the beam portion 31c and a portion connected to the heater wiring section 59b are rotationally symmetrical by 180 degrees with respect to the center position of the flat section 670. These two portions of the heater section 650 are electrically connected via the conductive flat section 670. The heater section 650 is connected to the flat section 670 having a substantially rectangular shape at two corners arranged on a predetermined diagonal line of the flat section 670. The heater wiring sections 659a and 59b pass over the beam portions 31c and 31b connected to two corners arranged on a predetermined diagonal line in the first-insulating-film membrane section 32 having a substantially rectangular shape.

The flat section 670 includes a flat surface 672 facing upward as in the flat section 70 shown in FIG. 6 and has a shape and an arrangement similar to those of the flat section 70. The materials of the heater section 650 and the flat section 670 are similar to those of the heater section 50 and the flat section 70 shown in FIG. 5.

The gas sensor using the heater section 650 and the flat section 670 according to Third Modified Example instead of the heater section 50 and flat section 70 shown in FIG. 5 also demonstrates effects similar to those of the gas sensors 10, 110, and 210.

4.4. Fourth Modified Example

FIG. 19C is a partial explanatory diagram illustrating a heater section 750 and a flat section 770 according to Fourth Modified Example together with the first insulating film 30, the heater wiring sections 59a and 59b, and the like on the membrane 18 and its peripheral portion. As shown in FIG. 19C, similarly to the heater section 50 shown in FIG. 5, the heater section 750 according to Fourth Modified Example is connected to the flat section 770.

In the heater section 750, a portion connected to the heater wiring section 759a passing over the beam portion 31c and a portion connected to the heater wiring section 59b are rotationally symmetrical by 180 degrees with respect to the center position of the flat section 770. These two portions of the heater section 750 are electrically connected via the conductive flat section 770. The heater section 750 is connected to the flat section 770 at two central positions in the X-axis direction of the outer edge of the flat section 770. The heater wiring sections 759a and 59b pass over the beam portions 31c and 31b connected to two corners arranged on a predetermined diagonal line in the first-insulating-film membrane section 32 having a substantially rectangular shape.

The flat section 770 includes a flat surface 772 facing upward as in the flat section 70 shown in FIG. 6 and has a shape and an arrangement similar to those of the flat section 70. The materials of the heater section 750 and the flat section 770 are similar to those of the heater section 50 and the flat section 70 shown in FIG. 5.

The gas sensor using the heater section 750 and the flat section 770 according to Fourth Modified Example instead of the heater section 50 and flat section 70 shown in FIG. 5 also demonstrates effects similar to those of the gas sensors 10, 110, and 210.

5. Example and Comparative Example

Hereinafter, the present disclosure is explained in more detail with Example and Comparative Example. However, the present disclosure is not limited to Example below.

As a sample according to Example, a gas sensor 10 according to First Embodiment shown in FIG. 1 to FIG. 7 was prepared. The main constituent materials used for the gas sensor 10 were as follows.

Figure 20:
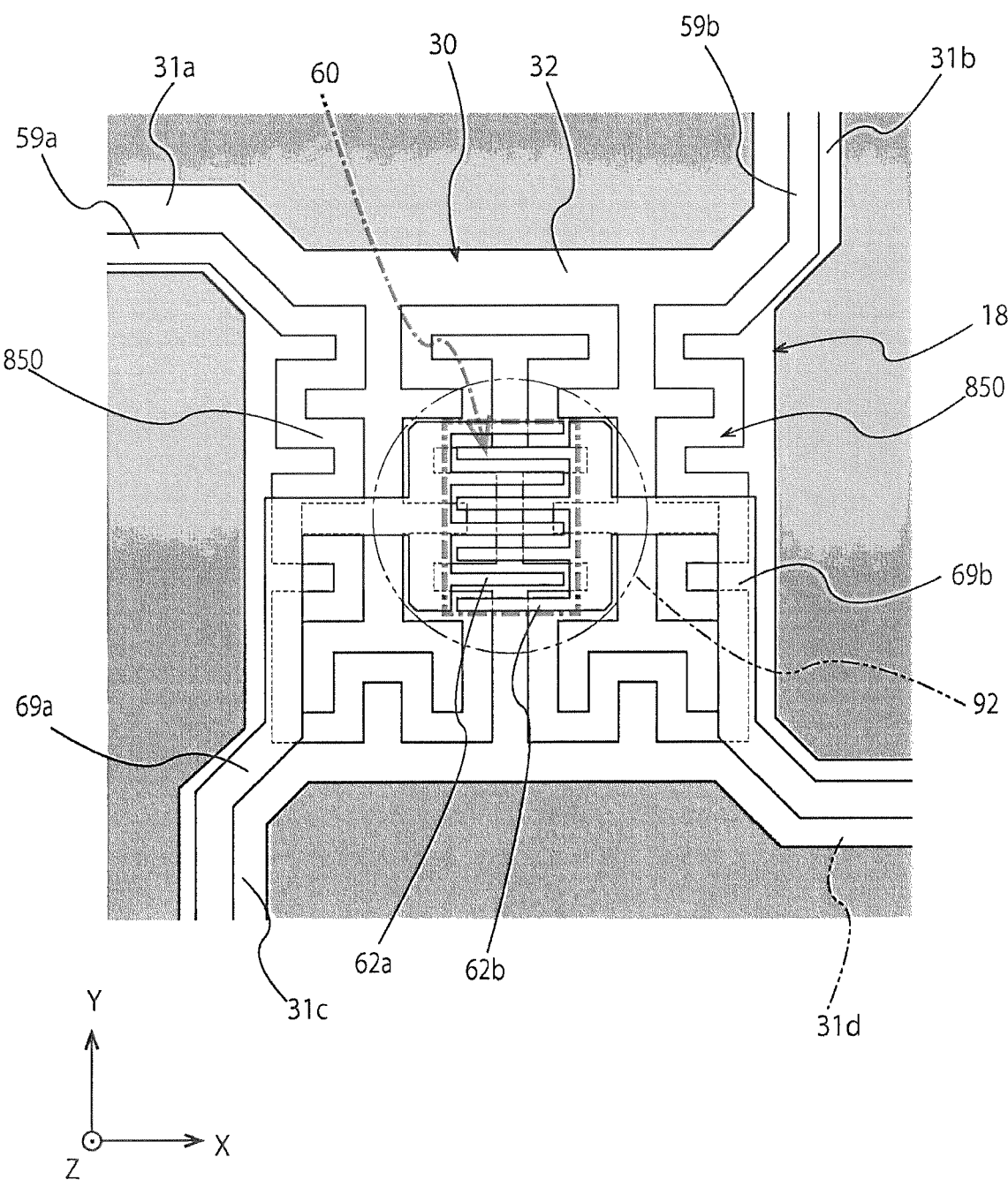
FIG. 20 is a schematic plan view of a gas sensor according to Comparative Example.

Base Member 20: Si
First Insulating Film 30: SiN/SiO$_2$
Second Insulating Film 40: SiN
Heater Section 50: Pt
Gas Detection Section 60: Pt
Flat Section 70: Pt As a sample according to Comparative Example, a gas sensor manufactured in the same manner as the gas sensor 10 without including a flat section and changing only the shape of a heater section 850 was prepared. FIG. 20 is a partial view illustrating a first insulating film 30, a heater section 850, heater wiring sections 59*a* and 59*b*, a gas detection section 60, and detection wiring sections 69*a* and 69*b* on a membrane 18 and its peripheral portion in a gas sensor according to Comparative Example.

Figure 21:
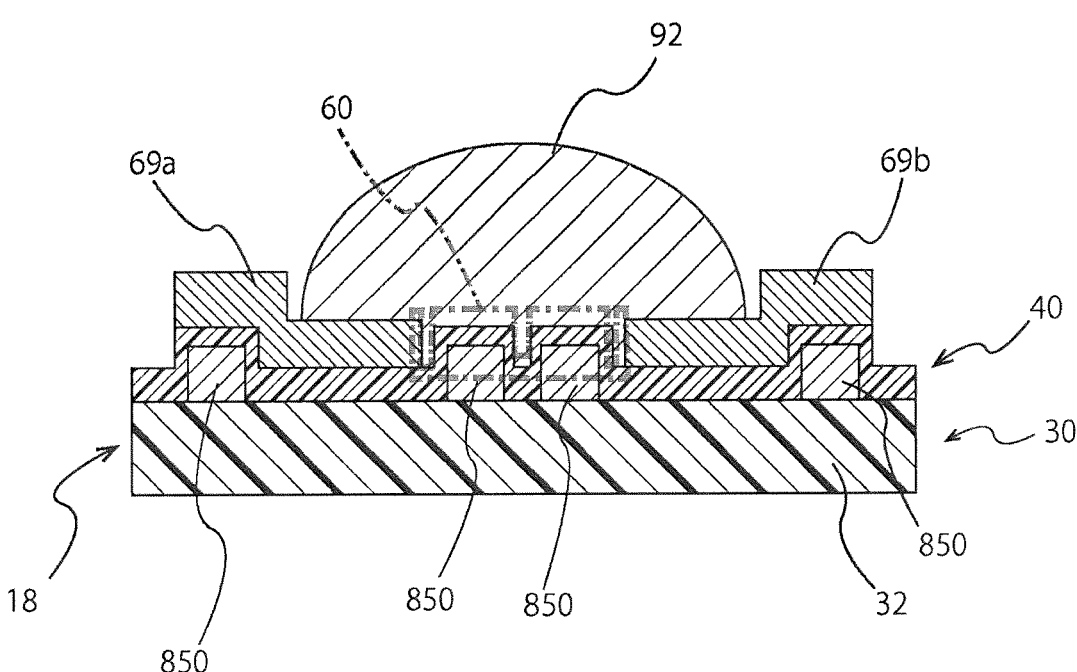
FIG. 21 is an enlarged cross-sectional view illustrating a section of the gas sensor shown in FIG. 20 disposed on the upper side of a cavity.

As shown in FIG. 20, the heater section 850 of the gas sensor according to Comparative Example was formed over almost the entire area on the first-insulating-film membrane portion 32 including the central region of the first-insulating-film membrane portion 32. FIG. 21 is an enlarged cross-sectional view of a section of the gas sensor according to Comparative Example disposed on the upper side of the cavity 22.

As shown in FIG. 20 and FIG. 21, the gas sensor according to Comparative Example did not include a flat section, and a part of the heater section 850 was also disposed below the gas detection section 60. Thus, in the gas sensor according to Comparative Example, the gas detection section 60 was formed on the second insulating film 40 having undulations and unevenness. Thus, the shape of the gas detection section 60 in the gas sensor according to Comparative Example was similar to that of the gas sensor 10 shown in FIG. 5 in the plan view of FIG. 20, but due to undulations and unevenness of the underlying layers, the gas detection section 60 is considered to have undulations and slopes different from those of the gas detection section 60 of the gas sensor 10 as a three-dimensional shape and a large variation in shape.

Figure 22:
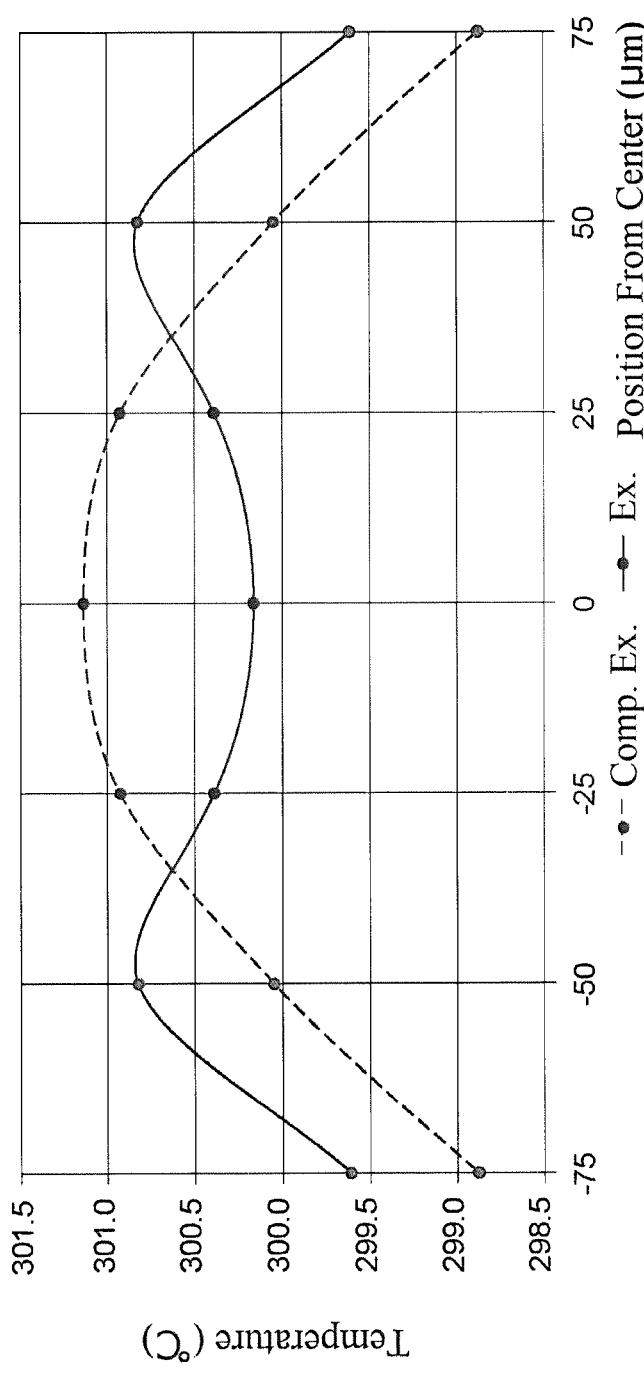
FIG. 22 is a graph showing calculation results of temperature distributions of gas sensors according to Example and Comparative Example.

First, using the prepared samples of Example and Comparative Example, the temperature around the center of the membrane 18 in each sample was calculated. The results are shown in FIG. 22. In the sample according to Comparative Example, as shown by the dotted line in FIG. 22, the temperature peak (highest value) appears at the center of the membrane 18, and the temperature parabolically decreases away from the center. In the sample according to Comparative Example, the temperature difference of about 2.3 degrees was formed between the highest temperature position (the center of the membrane 18) and the lowest temperature positions (75 μm away from the center of the membrane 18).

In contrast, in the sample according to Example, as shown by the solid line in FIG. 22, temperature peaks (highest values) appear at two locations approximately 50 μm away from the center of the membrane 18, and the temperature gradually decreased from the peak locations in the central part of the membrane 18 between the two locations. In the sample according to Example, the temperature difference of about 1.3 degrees was formed between the highest temperature positions (50 μm from the center of the membrane 18) and the lowest temperature positions (75 μm from the center of the membrane 18).

In the sample according to Example (the flat section 70 was formed closer to the center than the heater section 50 as shown in FIG. 22), the difference between the highest temperature and the lowest temperature was smaller, and the temperature distribution on the membrane 18 was uniform, compared to the sample according to Comparative Example (the heater section 850 was also formed in the central part of the membrane 18 without forming a flat section).

Figure 23:
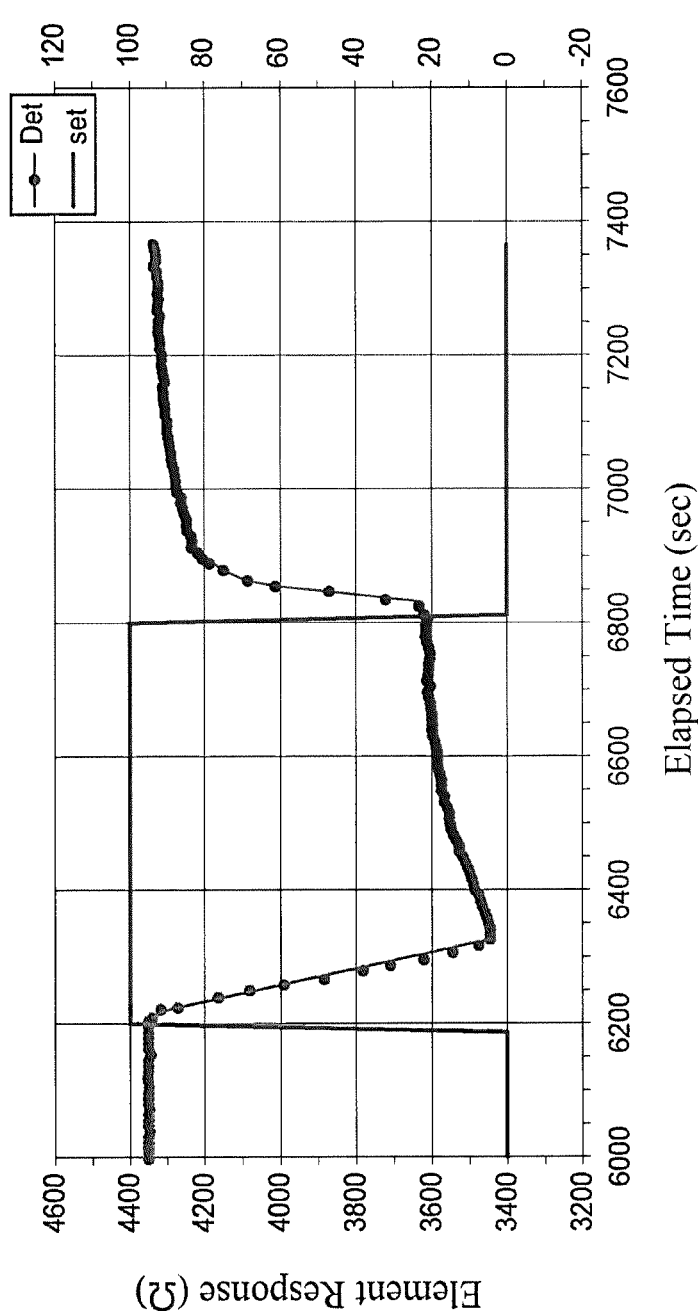
FIG. 23 is a graph showing an element responsiveness in the gas sensor according to Comparative Example.
Figure 24:
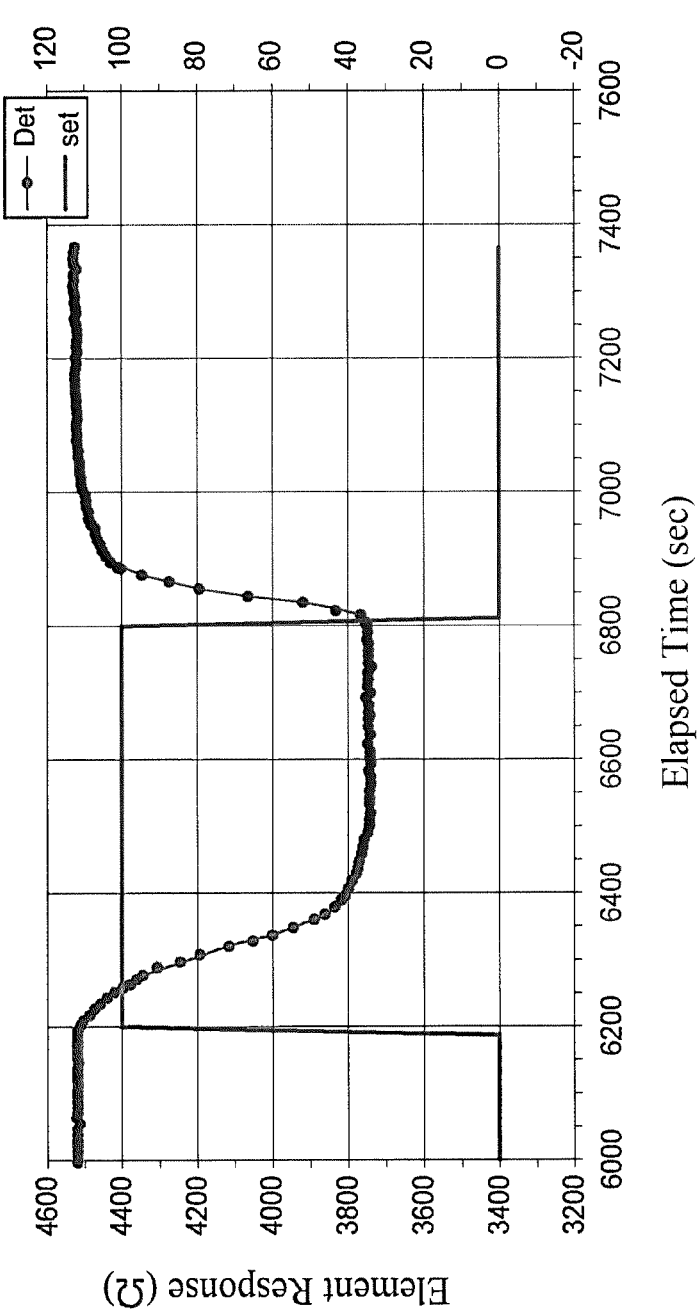
FIG. 24 is a graph showing an element responsiveness in the gas sensor according to Example.

Next, using the prepared samples according to Example and Comparative Example, response waveforms in CO gas detection were obtained. FIGS. 23 and 24 are graphs illustrating response waveforms (represented by black circles representing detected values and approximation curves of the detected values with left vertical axis representing unit Ω) obtained in the gas sensors according to Comparative Example and Example. Note that, the rectangular waveform shown together with the response waveform in FIG. 23 and FIG. 24 indicates a change in concentration (right vertical axis: ppm) of the CO gas supplied to the element. In obtaining the response waveform, the CO gas concentration was changed from 0 ppm to 100 ppm when the elapsed time (horizontal axis) was 6200 sec, and the CO gas concentration was changed from 100 ppm to 0 ppm when the elapsed time (horizontal axis) was 6800 sec.

As shown in FIG. 23, in the sample according to Comparative Example, an overshoot was observed in the response waveform at the time of detection of CO gas, the elapsed time until the overshoot was resolved was long, and the effect continued until more than 6600 seconds. The response waveform at the time of removal of CO gas took time to converge to the baseline and was not completely converged even at 7200 sec.

As shown in FIG. 24, in the sample according to Example, no overshoot was observed in the response waveform at the time of detection of CO gas, the elapsed time until the detected value stabilized was short, and the detected value was stabilized before 6600 sec. The response waveform at the time of removal of CO gas quickly converged to the baseline and was able to converge even before 7200 seconds.

In the sample according to Comparative Example, as shown in FIG. 22, the temperature gradient of the membrane 18 was large, and the temperature at the central part was easily too high, which is considered to be one of reasons why there was an overshoot of a response waveform as shown in FIG. 23. In the sample according to Comparative Example, the gas detection section had undulations and slopes and a non-uniform shape, which is considered to be one of the reasons why the response waveform was delayed in convergence to the baseline.

In the sample according to Example, the temperature distribution of the membrane 18 was uniform as shown in FIG. 22, and it is thus considered that an overshoot of the response waveform was prevented. Moreover, in the sample according to Example, the gas detection section 60 was formed on the flat section 70 and had a uniform shape, and thermal conductivity was improved with a uniform temperature distribution by the flat section 70, which is considered to reduce the time required for the response waveform to stabilize and converge.

Hereinabove, the gas sensors 10, 110, and 210 are described with reference to the embodiments, modified examples, and Example, but the present disclosure is not limited to only these embodiments, etc., and needless to say, many other embodiments and modified examples are included within the technical scope of the present disclosure. For example, the shapes of the flat section 70, the heater section 50, and the gas detection section 60 are not limited to shapes connecting straight lines, such as polygons and rectangular waves, and may be shapes connecting curved lines, such as circles, ellipses, and circular arcs, or shapes connecting a curved line and a straight line. The gas detection section 60 and 260 may include two or more pairs of electrodes 62*a*, 62*b*, 262*a*, and 262*b*.

DESCRIPTION OF THE REFERENCE NUMERICAL 10, 110, 210 . . . gas sensor
18 . . . membrane
18a . . . membrane peripheral hole
R1 . . . central region
20 . . . base member
22 . . . cavity
24 . . . cavity peripheral portion
30 . . . first insulating film
31a, 31b, 31c, 31d . . . beam portion
32 . . . first-insulating-film membrane portion
32a . . . side
34 . . . center
A1 . . . reference line
36 . . . first-insulating-film peripheral portion
40 . . . second insulating film
41 . . . first portion
42 . . . second portion
43 . . . third portion
44 . . . second-insulating-film membrane portion
46 . . . second-insulating-film peripheral portion
50, 450, 550, 650, 750 . . . heater section
52 . . . bending portion
L1 . . . length
L2 . . . amplitude
60, 160, 260 . . . gas detection section
62a, 62b, 262a, 262b . . . electrode
58a, 58b . . . heater terminal
59a, 59b, 659a, 759a . . . heater wiring section
68a, 68b . . . detection terminal
69a, 69b . . . detection wiring section
70, 470, 570, 670, 770 . . . flat section
72, 472, 572, 672, 772 . . . flat surface
92 . . . semiconductor material
165 . . . Pt wire
192 . . . catalyst material
294 . . . thermistor film

What is claimed is:

1. A gas sensor comprising:
a base member provided with a cavity;
a first insulating film including:
    a plurality of beam portions connected to a cavity peripheral portion as a peripheral portion of the cavity of the base member; and
    a first-insulating-film membrane portion held over the cavity by the beam portions;
a second insulating film laminated on an upper side of the first insulating film;
a heater section provided on an upper side of the first-insulating-film membrane portion;

a flat section provided between the first-insulating-film membrane portion and the second insulating film, disposed closer to a center of the first-insulating-film membrane portion than the heater section when viewed from above, and forming a flat surface facing upward; and
a gas detection section disposed on at least the second insulating film over the flat section and having an area smaller than that of the flat surface.

2. The gas sensor according to claim 1, wherein the flat section has a thermal conductivity higher than that of the second insulating film.

3. The gas sensor according to claim 1, wherein the flat section has the same material as the heater section.

4. The gas sensor according to claim 1, wherein the heater section includes a bending portion repeatedly bending with an amplitude of ½ or less of a length of a side of the first-insulating-film membrane portion having a substantially rectangular shape.

5. The gas sensor according to claim 1, wherein the heater section has a symmetrical shape with respect to a reference line extending in a horizontal direction through the center of the first-insulating-film membrane portion.

6. The gas sensor according to claim 1, wherein the heater section is connected to the flat section.

7. The gas sensor according to claim 1, wherein
the gas detection section includes at least a pair of electrodes in contact with a semiconductor material, and
gas is detected based on resistance change between the electrodes.

8. The gas sensor according to claim 1, wherein
the gas detection section includes a Pt wire in contact with a catalyst material, and
gas is detected based on resistance change of the Pt wire.

9. The gas sensor according to claim 1, wherein
the gas detection section includes at least a pair of electrodes in contact with a thermistor film, and
gas is detected based on resistance change between the electrodes.

10. The gas sensor according to claim 9, wherein the thermistor film is in contact with a catalyst material.

11. The gas sensor according to claim 1, further comprising a heater wiring section connecting a heater terminal provided in the cavity peripheral portion and the heater section through an upper side of at least one of the beam portions.

12. The gas sensor according to claim 1, further comprising a detection wiring section connecting a detection terminal provided in the cavity peripheral portion and the gas detection section through an upper side of at least one of the beam portions.

\* \* \* \* \*